US012689148B2

(12) United States Patent
Raad et al.

(10) Patent No.: US 12,689,148 B2
(45) Date of Patent: Jul. 21, 2026

(54) DURABLE REDUCED-SIZE POWER ADAPTERS

(71) Applicant: Apple Inc., Cupertino, CA (US)

(72) Inventors: Bahram Raad, San Jose, CA (US); Cesar Lozano Villarreal, Campbell, CA (US); Mathieu P. Roy, Los Gatos, CA (US); Jose Del Carmen, Jr., San Jose, CA (US); Michael J. Reis, San Jose, CA (US); Mahmoud R. Amini, Redwood City, CA (US); Adam H Herzog, Sunnyvale, CA (US); Nikhil S. Pansare, Santa Clara, CA (US); Peter J. Cameron, Scotts Valley, CA (US); Balal Khan, Guilford, CT (US); Kevin A. Oberther, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 18/413,966

(22) Filed: Jan. 16, 2024

(65) Prior Publication Data

US 2024/0405472 A1 Dec. 5, 2024

Related U.S. Application Data

(60) Provisional application No. 63/470,932, filed on Jun. 4, 2023.

(51) Int. Cl.

| | |
|---|---|
| ***H01R 13/502*** | (2006.01) |
| ***H01F 17/06*** | (2006.01) |
| ***H01F 27/28*** | (2006.01) |
| ***H01R 13/6581*** | (2011.01) |
| ***H01R 31/06*** | (2006.01) |

(52) U.S. Cl.

CPC ......... *H01R 13/502* (2013.01); *H01F 17/062* (2013.01); *H01F 27/2804* (2013.01); *H01F 27/2823* (2013.01); *H01R 13/6581* (2013.01); *H01R 31/06* (2013.01)

(58) Field of Classification Search

CPC .. H01R 13/502; H01R 13/6581; H01R 31/06; H01F 27/2804; H01F 27/2823

USPC ........................................................ 439/170

See application file for complete search history.

(56) References Cited

U.S. PATENT DOCUMENTS

| | | | | |
|---|---|---|---|---|
| 9,484,679 B2 * | 11/2016 | Guo | ........................ | H01R 43/16 |
| 9,742,098 B2 * | 8/2017 | Zhao | .................. | H01R 13/5202 |
| 9,997,866 B1 * | 6/2018 | Hsu | .................... | H01R 13/5202 |
| 10,050,365 B1 * | 8/2018 | Ju | ...................... | H01R 13/6583 |

(Continued)

*Primary Examiner* — Harshad C Patel

(74) *Attorney, Agent, or Firm* — Kilpatrick Townsend & Stockton LLP

(57) ABSTRACT

Power adapters and other electronic devices that are durable and can provide a large amount of power while having a small form factor. An example can provide a durable power adapter by providing a connector receptacle having a reinforced tongue. The tongue of the connector receptacle can be reinforced by having a center plate with one or more vertical portions that can be at least approximately at a right angle to a lateral portion of the center plate. This and other examples can provide a large amount of power while having a small form factor by providing a space efficient transformer having thermal dissipation components. This and other examples can provide a small form-factor by including a series of chokes formed as a module and including a variety of types of wires.

20 Claims, 13 Drawing Sheets

(56) References Cited

U.S. PATENT DOCUMENTS

| | | | | |
|---|---|---|---|---|
| 10,050,373 | B2 * | 8/2018 | Wang | H01R 13/426 |
| 10,950,981 | B2 * | 3/2021 | Chou | H01R 24/64 |
| 11,056,823 | B2 * | 7/2021 | Suzuki | H01R 13/521 |
| 2015/0244111 | A1 * | 8/2015 | Ju | H01R 12/724<br>439/607.05 |

* cited by examiner

DURABLE REDUCED-SIZE POWER ADAPTERS

CROSS-REFERENCE TO RELATED APPLICATIONS

This application claims the benefit of U.S. Provisional Application No. 63/470,932, filed on Jun. 4, 2023, which is incorporated by reference.

BACKGROUND

The number of types of electronic devices that are commercially available has increased tremendously the past few years and the rate of introduction of new devices shows no signs of abating. Devices such as tablet computers, laptop computers, desktop computers, all-in-one computers, cell phones, storage devices, wearable-computing devices, portable media players, navigation systems, monitors and other display devices, power adapters, and others, have become ubiquitous.

Many of these are portable devices that have an internal battery that allows users the freedom to carry and use them wherever they go. The internal batteries in these portable devices can be charged through a cable connected to a power adapter, which can convert AC (Alternating Current) power at a wall outlet to DC (Direct Current) power that can be used by the portable device to charge its internal batteries.

Users often need to take these power adapters with them, particularly when traveling or spending an extensive time away. For this and other reasons, it can be desirable that these power adapters have a small form factor. But some of these portable electronic devices can have large internal batteries, and users might want to charge these batteries quickly. Accordingly, it can be desirable that these power adapters be able to provide a great deal of power despite their limited size. Unfortunately, providing this much power can generate heat in a power adapter, which can compromise performance and device life expectancy. Excessive heat can also raise the temperature of an enclosure for the power adapter above what might be comfortable for a user to encounter. Accordingly, it can be desirable that these power adapters have good thermal management that enables them to provide the desired power.

Also, these power adapters can be subjected to situations that can significantly affect the product's reliability. This can make them, or a cable connected to them, more likely to be inadvertently kicked or otherwise exposed to a short-duration force, impulse, or impact. Accordingly, it can be desirable that these power adapters are durable such that they can survive such high forces, impulses, and impacts.

Thus, what is needed are power adapters that are durable and can provide large amounts of power while having a small form factor.

SUMMARY

Accordingly, embodiments of the present invention can provide power adapters and other electronic devices that are durable and can provide large amounts of power while having a small form factor.

An illustrative embodiment of the present invention can provide a durable power adapter by providing a connector receptacle having a reinforced tongue. The reinforced tongue can reduce the possibility of breakage or damage to the tongue when a cable having a connector insert mated with the connector receptacle is exposed to a high-energy event, such as an inadvertent pull of the cable, inadvertent kick by a user, a drop, or other such force event.

The tongue of the power adapter connector receptacle can be reinforced by having a center plate with one or more vertical portions that can be at least approximately at a right angle to a lateral portion of the center plate. These vertical portions can increase the stiffness and toughness of the center plate by increasing the moment of inertia of the center plate. The vertical portions can extend along sides or other portions of the center plate. The vertical portions can be attached to or include extension portions that extend to a front edge of the center plate. The extension portions can extend to or beyond the front edge and wrap around the front edge of the center plate. The extension portions can be bonded, welded, soldered, or otherwise attached to the front edge of the center plate.

The vertical portions can be formed in various ways in various embodiments of the present invention. The vertical portions and the other portions of the center plate can be formed as a single, unitary piece. The vertical portions can be formed along a side of the center plate by forging. The vertical portions and the center plate can be formed by 3-D printing, metal injection molding, computer-numerically machining, or other process. The vertical portions can be formed as part of the center plate by deep drawing or other plastic deformation process, by stamping, or other method. Where the vertical portions are stamped, a limit on the ratio of the radius of the curved stamped portion to the thickness of the center plate might limit the possible thickness of the center plate. By using a deep draw process, this limitation is not present and a thicker center plate can be used, resulting in a stronger tongue for the connector receptacle.

The vertical portions and the center plate can be formed of two or more pieces joined together. The vertical portions can be formed by soldering, welding, or bonding one or more separate or additional pieces to a top, bottom, or side surfaces of the center plate. The vertical portions can be formed of one or more separate or additional pieces attached along sides and a front of the center plate.

The vertical portions and center plate can be symmetrical, that is the top and the bottom of the center plate and vertical portions can be the same. Alternatively, the center plate and vertical portions can be asymmetrical, that is, the top and bottom of the center plate and vertical portions can be different. For example, where the vertical portions are formed by deep drawing or stamping, the vertical portions can extend along sides of a top of the center plate while there is an absence of corresponding vertical portions extending along a side of a bottom of the center plate. Where the reinforced tongue is used in a power adapter that is plugged into a wall outlet and the connector receptacle is on a side adjacent to the wall, force events can tend to pull the tongue away from the wall. In such a device, it can be beneficial to position the vertical portions such that the vertical portions tend to be in tension when a force event happens, thereby avoiding buckling that can occur if the vertical portions are in compression. This can be achieved by having the vertical portions facing the wall and away from the likely direction of the force event.

These and other embodiments of the present invention can include other structures for reinforcement of the tongue and other portions of a connector receptacle. For example, ground contacts on a top and bottom of the tongue can include contacting portions extending towards a front of the tongue. Second portions of the ground contacts can be folded under the contacting portions. Connection plates can extend from the second portions towards a middle of the center plate and can be bonded, welded, soldered, or otherwise attached to a surface of the center plate. These ground contacts can provide a low impedance ground path. These ground contacts can further provide reinforcement of the tongue to help prevent damage to the front edge of the tongue during a kick or other force event.

The center plate and vertical portions can be formed in various ways. For example, the openings can be stamped. An outline of the center plate can be formed by stamping. The vertical portions can be formed by deep drawing. The extension portions can be folded against a front edge of the center plate and welded, bonded, soldered, or otherwise attached. The center plate can then be cut from a carrier, which can be attached to the center plate at side tabs or other portion. In these and other embodiments of the present invention, the vertical portions can extend to through-hole contacting portions of the center plate for further reinforcement.

The vertical portions and center plate can be formed of various materials. For example, they can be formed of stainless steel, steel, copper, copper alloy, copper titanium, phosphor bronze, or other material or combination of materials. They can be plated or coated with nickel, gold, palladium-nickel, palladium or other material or combination of materials. Harder materials can be used to further improve the strength of the reinforced tongue, though cracking at any drawn portions can be avoided using softer materials.

Embodiments of the present invention are well-suited to providing durable tongues for power adapters. For example, since power adapters are attached to a wall when plugged into an outlet, they can be particularly susceptible to a kick or other force event. These and other embodiments of the present invention can provide durable tongues for connector receptacles in other electronic devices as well, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, accessories for these devices, and other devices.

These and other embodiments of the present invention can provide a large amount of power while having a small form factor by providing a space efficient transformer having thermal dissipation components. The transformer can include a printed circuit board where coils for a winding of one side of the transformer can be formed on one or more layers. The coils can be formed by metalizing patterns on layers of the printed circuit board, the coils can be formed by etching metalized layers of a printed circuit board, or the coils can be formed in other ways. The printed circuit board can have a roughly annular shape, that is, circular with a central opening. A wire can be coiled on a top and bottom surface of the printed circuit board to form the winding on the other side of the transformer. The wire and printed circuit board can form a printed circuit board assembly. The coiled wire can be self-bonding to help keep the loops of the coils in place during manufacturing and use. An adhesive on the surface of the wire can be heat activated and used to fix adjacent loops of wires together to form the coils and to fix the coils to the surfaces of the printed circuit board. The coiled wire can be Litz wires. The coiled wire on the top and bottom surfaces can be the primary winding of the transformer, while the metalized or etched layers of the printed circuit board can form the secondary side, though these roles can be reversed. By forming the primary winding from a single wire wound in a single coil on a top surface of the printed circuit board and a single coil on the bottom of the printed circuit board, the primary winding can be made in a consistent, repeatable, well controlled manner. Similarly, by printing the secondary winding on layers of the printed circuit board, the secondary winding can also be made in a consistent, repeatable, well controlled manner. This can help to improve efficiency and reduce electromagnetic noise generated by the transformer. This configuration, a secondary winding within two coils of a primary winding, can be referred to as an interleaved configuration. This interleaving can help to reduce AC losses, that is, it can reduce eddy currents in the transformer.

By using a single wire for both the top and bottom coil, the impedance of the primary winding can be reduced. Also, notches in the printed circuit board can provide efficient transitions from the top surface of the printed circuit board to the bottom surface of the printed circuit board. Specifically, a first notch can be used to route the single wire from the top surface of the printed circuit board to the bottom surface of the printed circuit board. A second notch can be used for the single wire to return to the top surface of the printed circuit board. Alternatively, the top coil and bottom coil could be joined by a first interconnect, such as first vias in the printed circuit board, and the bottom coil could be attached to the top surface of printed circuit board by a second interconnect, such as second vias in the printed circuit board. But the addition of these interconnects could increase impedance in the primary coil, which could reduce efficiency and increase electromagnetic interference. The top and bottom coil could alternatively be joined by routing the single wire through the central opening, but that could widen the printed circuit board assembly by a wire width. The bottom coil could return to the top surface of the printed circuit board by routing the single wire outside of the printed circuit board, but again that could widen the printed circuit board assembly by a wire width. The single wire could alternatively be routed over or under one or both of the top coil and the second coil, but this could increase the height of the printed circuit board assembly by one or more wire widths.

These transformers can further have good electromagnetic interference performance. For example, one or more cancellation shields can be placed between the primary winding and the secondary winding. That is, the printed circuit board can be a four-layer board formed of FR4 or other material, where two layers are used for the secondary winding and two layers are used for the cancellation shields. A top cancellation shield can be positioned between the secondary winding and the top coil of the primary winding and a bottom cancellation shield can be positioned between the secondary winding and the bottom coil of the primary winding. Also, the secondary winding can be connected to four terminals, where each terminal of the secondary winding is connected to two terminals. These four terminals can be interleaved to help reduce differential noise at the terminals of the secondary winding. Using two terminals in parallel for each winding can also reduce the series impedance for the secondary winding. Also, these transformers can be positioned such that any acoustic noise generated by the coils of the transformer does not couple, or has limited coupling, to portions of the enclosure of the power adapter or other electronic device. For example, the coils can be positioned laterally in a power adapter where the lateral direction is through the widest part of the device enclosure. Acoustic noise can further be reduced since the loops forming the coils of the primary winding can be adhered together and to the transformer printed circuit board and therefore can be less able to vibrate.

The primary winding can handle higher voltage and lower current, while the secondary winding can be arranged for lower voltage and higher current. The primary winding can be connected to receive an input voltage, for example from a series of components that can include a fuse, one or more chokes, a rectifier, and a filter, while the secondary winding can provide an output to other circuits and components in the power adapter or other electronic device. To handle the higher current, the metalized or etched layers on the printed circuit board forming the secondary winding can be wide and be formed using thick metal layers.

A core can surround much or all of the circular printed circuit board assembly and have a central portion extending through the central opening. The core can have a top portion over the printed circuit board and a bottom portion under the printed circuit board. Side portions can join the top portion and the bottom portion. The core can have an airgap between the central portion and the top portion of the core. The transformer core can be formed of ferrite, nanocrystalline, or other material.

Embodiments of the present invention can provide transformers with good thermal performance and a high manufacturing repeatability. Again, a single wire can be looped in a single coil on the top side of the printed circuit board and a single coil on the bottom side of the printed circuit board. As a result, the core can have a space above the printed circuit board and between the coil on the top surface of the printed circuit board and the top portion of the core. A thermally conductive structure can be placed in the opening. The thermally conductive structure can be a thermal elastomer or other thermally conductive structure. The thermally conductive structure can have a serpentine or "S" shaped cross-section, or other shaped cross-section that is compressible to improve thermal contact between the coil on the top surface of the printed circuit board and the top portion of the core. In these and other embodiments of the present invention, the thermally conductive structure can provide good thermal contact between the top of the printed circuit board assembly and the top portion of the core across all manufacturing tolerance conditions. The thermally conductive structure can be assembled in compression to form a good thermal connection between the printed circuit board assembly and core, thereby reducing local heating in the transformer. The thermally conductive structure can be formed of various materials, such as silicone, room-temperature-vulcanizing silicone, epoxy, aluminum oxide, polyurethane, or other material or combination of these and other materials. The space between the coil on the top surface of the printed circuit board and the top portion of the core can also help to provide a greater distance from the airgap of the core to the printed circuit board assembly. This distance can help to prevent heating caused by the flux in the airgap from reaching the printed circuit board assembly.

The transformer core, printed circuit board, and wire coil can be housed in an insulative housing to form a transformer module. The insulative housing can electrically isolate the transformer from other circuits in the power adapter or other electronic device. The transformer module can be mounted on a printed circuit board or other appropriate substrate. Space can be provided between the transformer module and the printed circuit board for cooling and placement of additional surface-mount devices and other components. Additional thermal elements formed of a thermal elastomer can be positioned above, below, or at or around sides of the transformer module. The thermally elements can be elastomers, sheets of graphite, or other material. The use of elastomers or sheets of graphite can help to reduce the amount of thermal glues or silicones that might be necessary. Eliminating or reducing thermal glues or silicones can enable better inspection, reworking, and repairs of a power adapter or other electronic device. Eliminating or reducing thermal glues or silicones can also allow for the reuse and recycling of modules or portions of power adapter or other electronic device. Also, thermal glues and silicones can often be applied in an inconsistent manner during manufacturing. Using elastomers or sheets of graphite can help to improve the repeatability of a power adapter's thermal performance.

These and other embodiments of the present invention can provide a small form factor by providing a choke module. The choke module can include a first low-frequency choke and a second high-frequency choke, both supported by a housing. The first low-frequency choke can be a common-mode choke or the first low-frequency choke can be a differential-mode choke. The first low-frequency choke can include a rectangular core. The rectangular core can be formed by either two U-shape or two C-shape cores (or similar shaped core.) The core for the first low-frequency choke can be formed of ferrite, nanocrystalline, or other material. A first wire wound can be wound on a first leg of the core and a second wire can be wound on a second leg of the core. The first wire and the second wire can be flat wires, that is, they can have a flat cross-section. The wires can have a rectangular shape, a square shape, or other similar shaped cross-section. Using flat, rectangular, or square wire can help to reduce the series impedance of the coils or windings and improve the consistency of the coils or windings, leading to better and more consistent performance, including reducing an amount of electromagnetic interference generated by the choke module and improved common-mode coupling. The first and second wires can instead be round, oval, or have other shaped cross-section. The corners of the wires can be slightly rounded for manufacturability. Epoxy, wire enamel, or other material can be placed on the first and second wires before or during winding to prevent current from flowing between loops and bypassing or not flowing through portions of the coils or windings. Epoxy, wire enamel, or other material can be over the coils or windings to help to reduce any acoustic noise.

The second high-frequency choke can be a common-mode choke or the second low-frequency choke can be a differential-mode choke. The second high-frequency choke can have a toroidal core. The core for the second high-frequency choke can be formed of ferrite, nanocrystal, or other material. A first wire and a second wire can be wound adjacently around the core. The first and second wires can be round or flat wires, that is, they can have a round or flat cross-section. The wires can have a rectangular shape, a square shape, or other similar shaped cross-section.

A housing can support the first low-frequency choke and the second high-frequency choke in a space efficient manner. One or more wires of the first low-frequency choke can be connected to one or more wires of the second high-frequency choke in the module itself. This can help to further save space as compared to making all connections on a printed circuit board or other appropriate substrate. The housing can further provide additional support for the leads of the first low-frequency choke such that the actual wires of the first low-frequency choke can be used as pins to be inserted into a printed circuit board or other appropriate substrate, or through an insulative housing and then into a printed circuit board or other appropriate substrate.

In these and other embodiments of the present invention, power from an outlet can be received by an AC connector of a power adapter or other electronic device. The power can be provided through a fuse to the first low-frequency choke, which can provide an output to the second high-frequency choke. The second high-frequency choke can provide an output to circuitry including filters and rectification circuits, which can provide an output to the transformer module described above. The transformer can provide an output that can be used to generate a DC power that can be provided at the connector receptacle described above. In these and other embodiments of the present invention, the order of the first low-frequency choke and the second high-frequency choke can be reversed.

In these and other embodiments of the present invention, the core of the first low-frequency choke can be coated with an epoxy, enamel, or other protective material. This can help to prevent a short between the first wire and the second wire by insulting both wires from the core. Using flat wires for both the first wire and the second wire allows an airgap between the coils and the core that can protect the epoxy, enamel, or other protective material, thereby further helping to reduce or prevent a chance of shorting between the first wire and the second wire. Additional protective material, such as wire enamel, epoxy, or other material, can be placed on the windings themselves. The airgap between the coils and the core can help to protect the wire enamel, epoxy, or other additional protective material as well.

In various embodiments of the present invention, center plates, shields, contacts, and other conductive portions of a power adapter or other electronic device can be formed by stamping, metal-injection molding, machining, micro-machining, 3-D printing, or other manufacturing process. The conductive portions can be formed of stainless steel, steel, copper, copper alloy, copper titanium, phosphor bronze, or other material or combination of materials. They can be plated or coated with nickel, gold, palladium-nickel, palladium or other material or combination of materials. The nonconductive portions, such as the housing and other structures can be formed using injection or other molding, 3-D printing, machining, or other manufacturing process. The nonconductive portions can be formed of silicon or silicone, rubber, hard rubber, plastic, nylon, liquid-crystal polymers (LCPs), ceramics, polyamide, or other nonconductive material or combination of materials. The printed circuit boards used can be formed of FR-4 or other material.

Embodiments of the present invention can provide connector receptacles, transformers, and chokes that can be located in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, accessories for these devices, and other devices. The connector receptacles can provide interconnect pathways for signals that are compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention can provide connector receptacles that can be used to provide a reduced set of functions for one or more of these standards. In various embodiments of the present invention, these interconnect paths provided by these connector receptacles can be used to convey power, ground, signals, test points, and other voltage, current, data, or other information.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
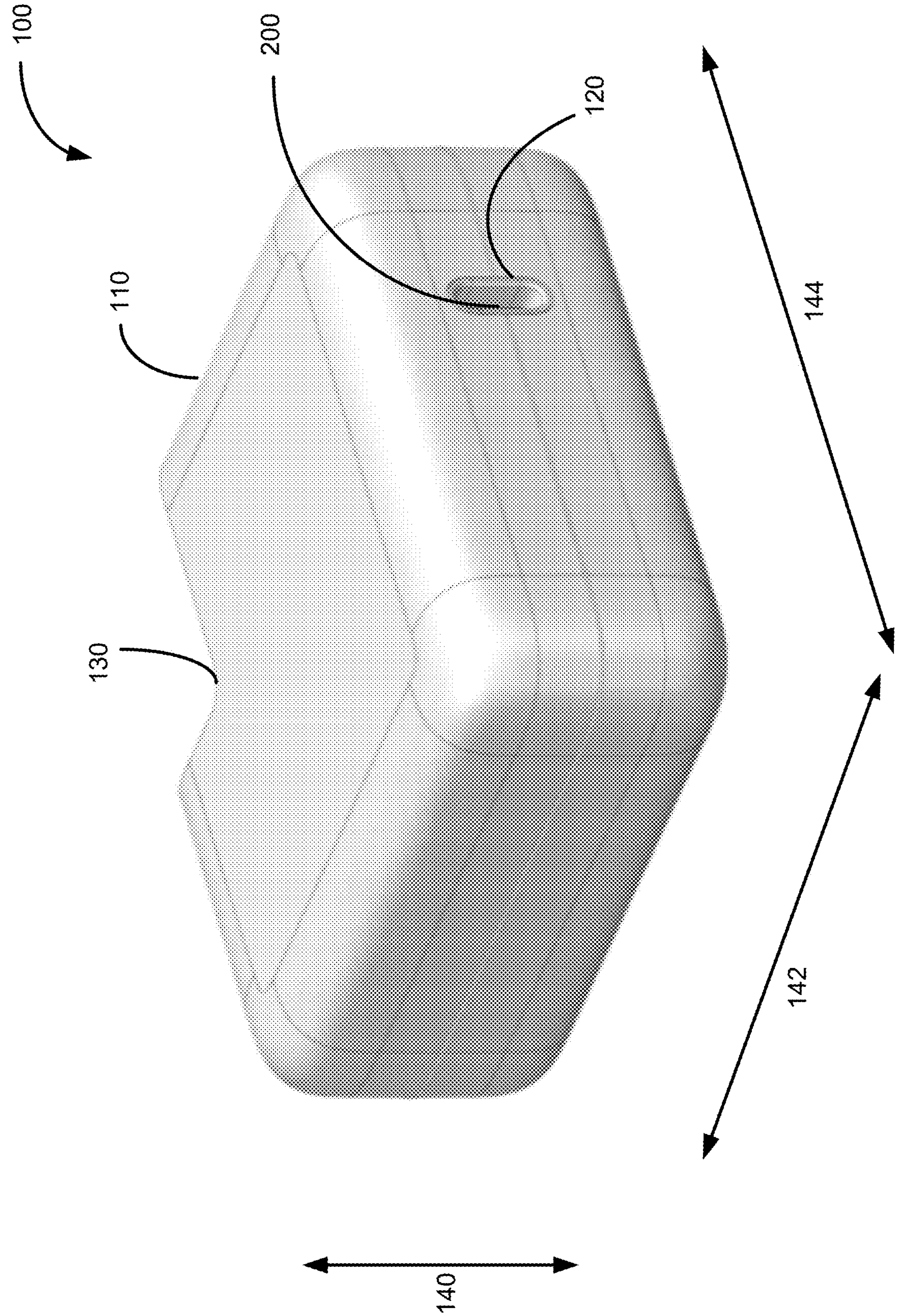
FIG. 1 illustrates an electronic system that can be improved by the incorporation of embodiments of the present invention.

FIG. 1 illustrates an electronic system that can be improved by the incorporation of an embodiment of the present invention. This figure, as with the other included figures, is shown for illustrative purposes and does not limit either the possible embodiments of the present invention or the claims.

Power adapter 100 having an enclosure 110 is shown. Enclosure 110 can include opening 120 for connector receptacle 200. Power adapter 100 can include space 130 for accepting an AC connector (not shown.) The AC connector can be compatible with power outlets (not shown) in a region of the world. The AC connector can receive power from an outlet and provide power to components inside power adapter 100. The AC connector can receive AC power and provide the AC power to the power adapter 100. Power adapter 100 can convert the AC power to DC power and provide DC power at connector receptacle 200. Power adapter 100 can have a shorter dimension 140, and two longer dimensions 142 and 144. While embodiments of the present invention are well-suited for use in power adapters such as power adapter 100, these and other embodiments of the present invention can be used in other power adapters and other electronics devices as well. For example, embodiments of the present invention can provide connector receptacles that can be located in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, accessories for these devices, and other devices. Also, while connector receptacle 200 is shown as a USB Type-C connector receptacle, connector receptacle 200 can be another type of connector, such as other USB standards, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

During use, power adapter 100 can be connected to a power outlet. Typically, this power outlet can be on a wall, though the power outlet can be on a power strip on the desk or other locations. An electronic device, such as a smart phone or portable computing device, can be connected through a cable to connector receptacle 200 in opening 120. This can leave connector receptacle 200 vulnerable. For example, a user can inadvertently kick or trip over the cable, thereby applying a force to connector receptacle 200. A user can walk away with the electronic device, thereby pulling on the cable and again applying a force to connector receptacle 200. Accordingly, it can be desirable to provide a connector receptacle 200 that is robust and durable. Examples of such connector receptacles are shown in the following figures.

Figure 2:
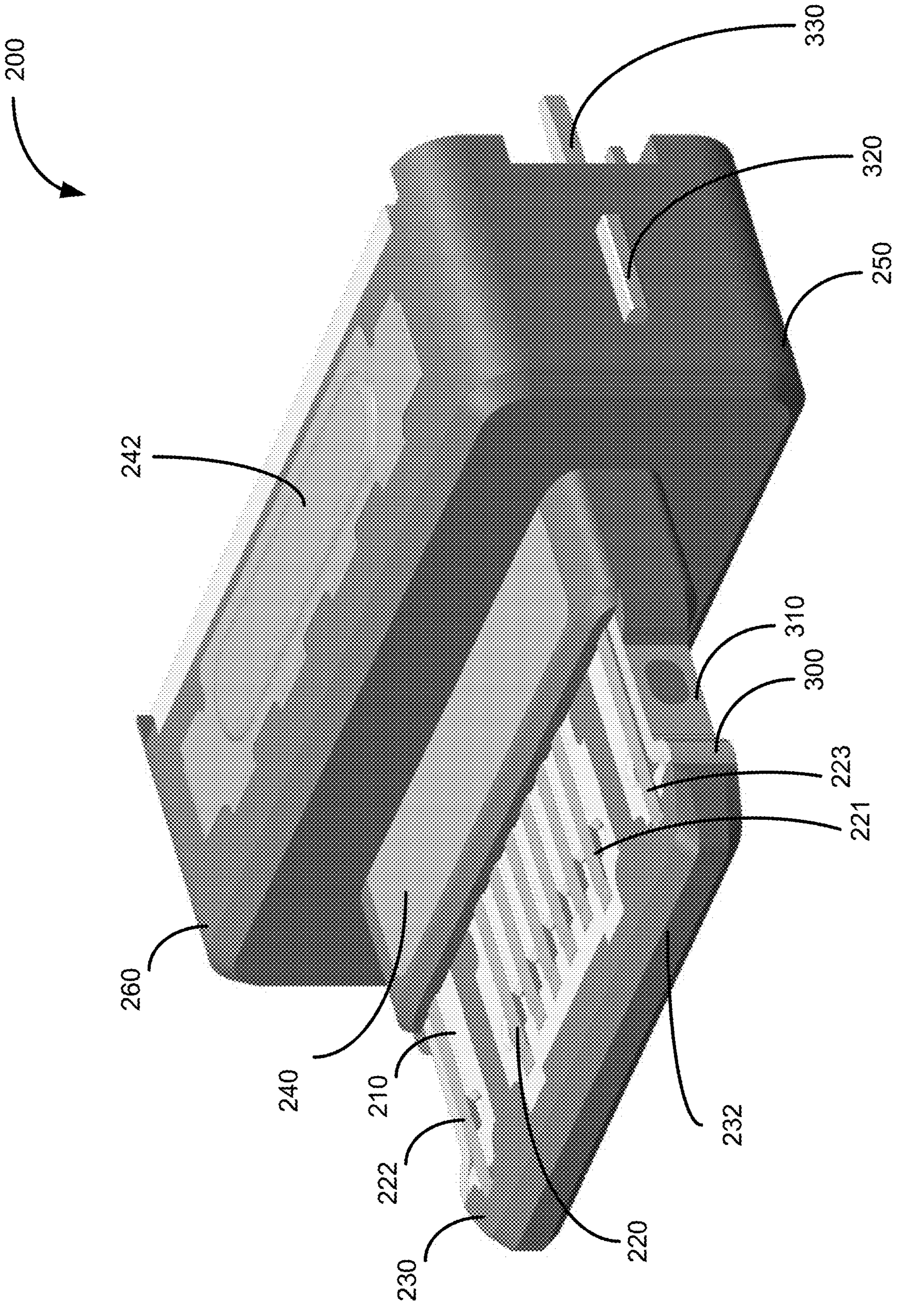
FIG. 2 illustrates a connector receptacle according to an embodiment of the present invention.

FIG. 2 illustrates a connector receptacle according to an embodiment of the present invention. Connector receptacle 200 can include base 260 and tongue 230. Connector receptacle 200 can include housing 250. Housing 250 can support sub-housing 210, which can support a number of contacts 220. Tongue 230 can further support ground contacts 222 and center plate 300. Center plate 300 can include side ground contacts 310, side ground tabs 320, and through-hole contacting portion 330. Base 260 can support ground contact 242, while tongue 230 can further support ground plate 240. Base 260 can provide a support for connector receptacle 200 in power adapter 100 (shown in FIG. 1) or other electronic device, while tongue 230 can extend from base 260. Base 260 and tongue 230 can each be partially formed by the molding forming housing 250.

Ground plate 240 can electrically connect to ground contacts (not shown) in a connector insert (not shown) when the connector insert is mated with connector receptacle 200. Contacts 220 can include contacting portions 221 and ground contacts 222 can include contacting portion 223 exposed on top or bottom surface of tongue 230. Contacts 220 and ground contacts 222 can form electrical connections at contacting portions 221 and contacting portions 223, respectively, with corresponding contacts in a connector insert when the connector insert is mated with connector receptacle 200. Side ground contacts 310 can form a ground path with corresponding contacts in a connector insert (not shown) when the connector insert is mated with connector receptacle 200. Side ground tabs 320 and ground contact 242 can form a ground path inside power adapter 100. In these and other embodiments of the present invention, ground contact 242 and corresponding ground contact 282 (shown in FIG. 3A) can be omitted, for example in power-only systems with low data rates where the additional shielding might not be needed. Through-hole contacting portion 330 can be inserted and soldered into a corresponding opening in a printed circuit board or other appropriate substrate (not shown.)

Again, connector receptacle 200 can experience forces during use that can damage tongue 230 or other portions of connector receptacle 200. For example, tongue 230 can be broken or otherwise damaged. Other damage such as cracking or breaking along a front edge 232 of tongue 230 can occur. Accordingly, embodiments of the present invention can provide structures to prevent damage to tongue 230 itself and along its front edge 232. Examples are shown in the following figures.

Figure 3A:
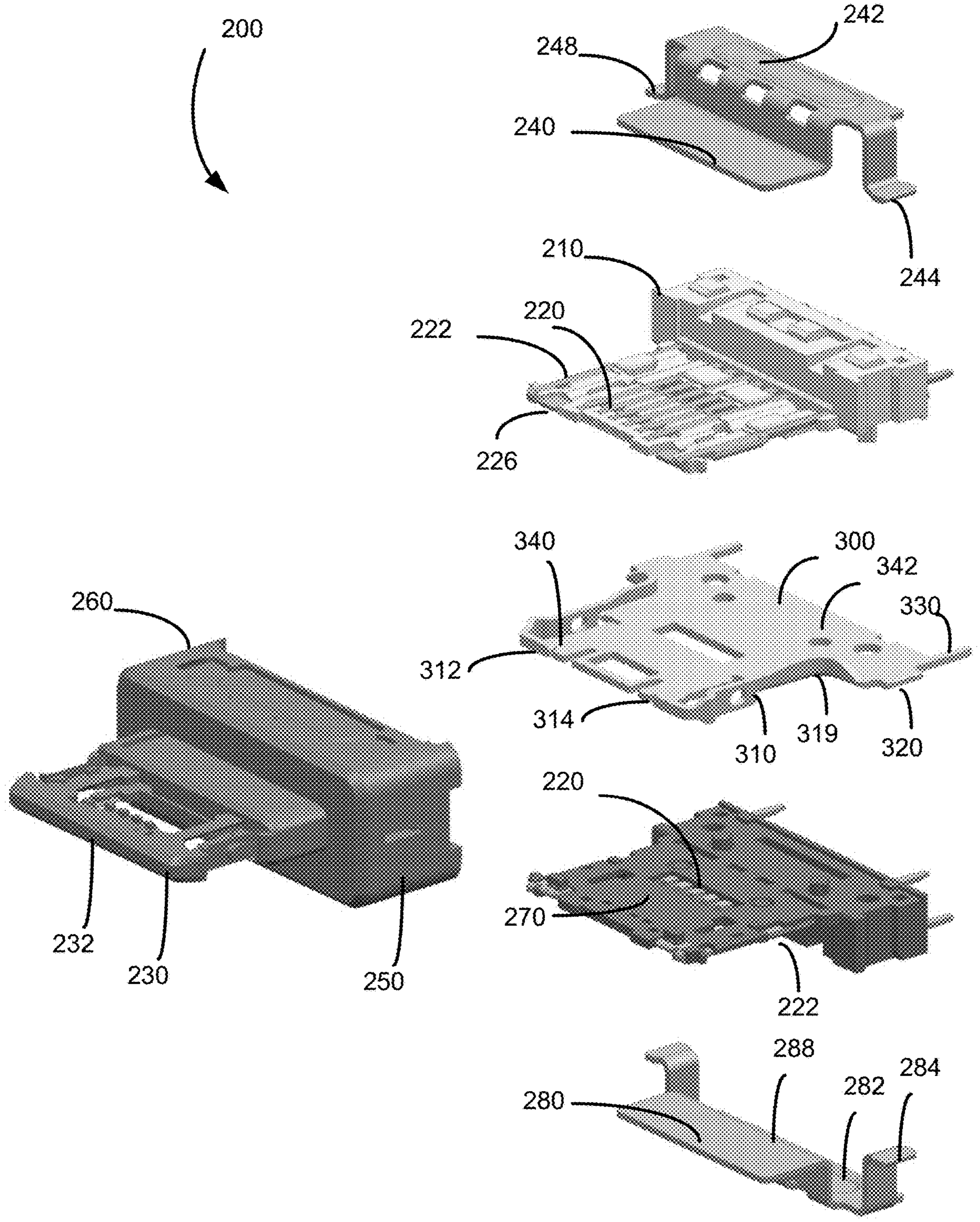
FIG. 3A is an exploded view of the connector receptacle FIG. 2.

FIG. 3A is an exploded view of the connector receptacle FIG. 2. Connector receptacle 200 can include center plate 300. Center plate 300 can include front edge 314 and through-hole contacting portions 330. Center plate 300 can further include side ground tabs 320 and side ground contacts 310. Center plate 300 can include vertical portions 319. Vertical portions 319 can increase the stiffness and toughness of center plate 300 by increasing the moment of inertia of the center plate 300. Extension portion 312 can extend from vertical portion 319 and wrap around and be attached to front edge 314 of center plate 300. Extension portion 312 can be soldered, bonded, or laser welded to front edge 314, or attached in other ways.

Connector receptacle 200 can further include housing 250. Housing 250 can include base 260 and tongue 230. Housing 250 can be formed of polyamide, nylon, glass-filled nylon, or other material and insert molded around sub-housing 210 and sub-housing 270. Housing 250 can support sub-housing 210. Sub-housing 210 can support contacts 220 and ground contacts 222 on a top side of tongue 230. Housing 250 can further support sub-housing 270. Sub-housing 270 can support contacts 220 and ground contacts 222 on a bottom side of tongue 230. Sub-housing 210 and sub-housing 270 can be formed of polyamide, nylon, glass-filled nylon, or other material and insert molded around their contacts 220 and ground contacts 222. Contacts 220 and ground contacts 222 can be formed of stainless steel, steel, copper, copper alloy, copper titanium, phosphor bronze, or other material or combination of materials. They can be plated or coated with nickel, gold, palladium-nickel, palladium or other material or combination of materials.

Connector receptacle 200 can further include top shielding 248, which can include ground plate 240, ground contact 242, and side ground tab 244. Bottom shielding 288 can include ground plate 280, ground contact 282, and side ground tab 284. Side ground tab 284 and side ground tab 244 can be attached to side ground tab 320 on each side of connector receptacle 200. Top shielding 248 and bottom shielding 288 can be formed of stainless steel, steel, copper, copper alloy, copper titanium, phosphor bronze, or other material or combination of materials. They can be plated or coated with nickel, gold, palladium-nickel, palladium or other material or combination of materials.

Center plate 300 can be formed in various ways. For example, an outline of center plate 300 can be stamped. Vertical portions 319 can be formed as part of center plate 300. That is, vertical portions 319 and the other portions of center plate 300 can be formed as a single, unitary piece. Alternatively, vertical portions 319 can be formed separately from center plate 300 and later joined to center plate 300. Vertical portions 319 can be formed by deep drawing or other plastic deformation process. When this is done, vertical portions 319 can extend above center plate 300 in an approximately orthogonal direction. Due to the nature of the deep drawing process, vertical portions 319 might not extend substantially below center plate 300. Vertical portions 319 can be formed in other ways. For example, vertical portions 319 can be formed by stamping, or other process. Vertical portions 319 can be formed along a side of center plate 300 by forging. Center plate 300 and vertical portions 319 can be formed by 3-D printing, metal-injection molding, computer-numerically machining, or other additive or forming process.

Where vertical portions 319 are stamped, a limit on the ratio of the radius of the curved stamped portion to the thickness of center plate 300 might limit the possible thickness of center plate 300. By using a deep draw process, this limitation is not present and a thicker center plate 300 can be used, resulting in a stronger tongue 230 for connector receptacle 200.

In this example, vertical portions 319 can be formed by a deep drawing process. This deep drawing process can additionally rotate extension portion 312 through a 90 degree right angle relative to a top surface of center plate 300. Extension portion 312 can be folded around to front edge 314 by stamping or other process. In these and other embodiments of the present invention, extension portion 312 can be stamped to be at a right angle to center plate 300 by a step separate from the deep drawings of vertical portions 319.

Center plate 300 and vertical portions 319 can be formed using various sequences of steps. For example, the openings in center plate 300 can be stamped. An outline of center plate 300 can be formed by stamping. Vertical portions 319 can be formed by deep drawing. This step can also move extension portions 312 to the vertical position. The extension portions 312 can be folded against front edge 314 of center plate 300 and bonded, welded, soldered, or attached in other way. Center plate 300 can then be cut from a carrier (not shown), which can be attached to center plate 300 at side ground tabs 320.

Vertical portions 319 and center plate 300 can be formed of various materials. For example, they can be formed of stainless steel, steel, copper, copper alloy, copper titanium, phosphor bronze, or other material or combination of materials. They can be plated or coated with nickel, gold, palladium-nickel, palladium or other material or combination of materials. Harder materials can be used to further improve the strength of the reinforced tongue, though cracking at any drawn portions can be avoided using softer materials.

Vertical portions 319 and center plate 300 can be symmetrical, that is the top and the bottom of center plate 300 and vertical portions 319 can be the same. Alternatively, center plate 300 and vertical portions 319 can be asymmetrical, that is, the top and bottom of center plate 300 and vertical portions 319 can be different. For example, where vertical portions 319 are formed by deep drawing, vertical portions 319 can extend along sides of a top of center plate 300 while there can be an absence of corresponding vertical portions 319 extending along a side of a bottom of center plate 300. Where the reinforced tongue 230 is used in a power adapter 100 (shown in FIG. 1) that is plugged into a wall outlet (not shown) and connector receptacle 200 is on a side of power adapter 100 adjacent to the wall, force events can tend to pull tongue 230 away from the wall. In such a device, it can be beneficial to position vertical portions 319 such that vertical portions 319 tend to be in tension when a force event happens, thereby avoiding buckling that can occur if vertical portions 319 are in compression. This can be achieved by having vertical portions 319 facing the wall and away from the likely direction of the force event.

Figure 4:
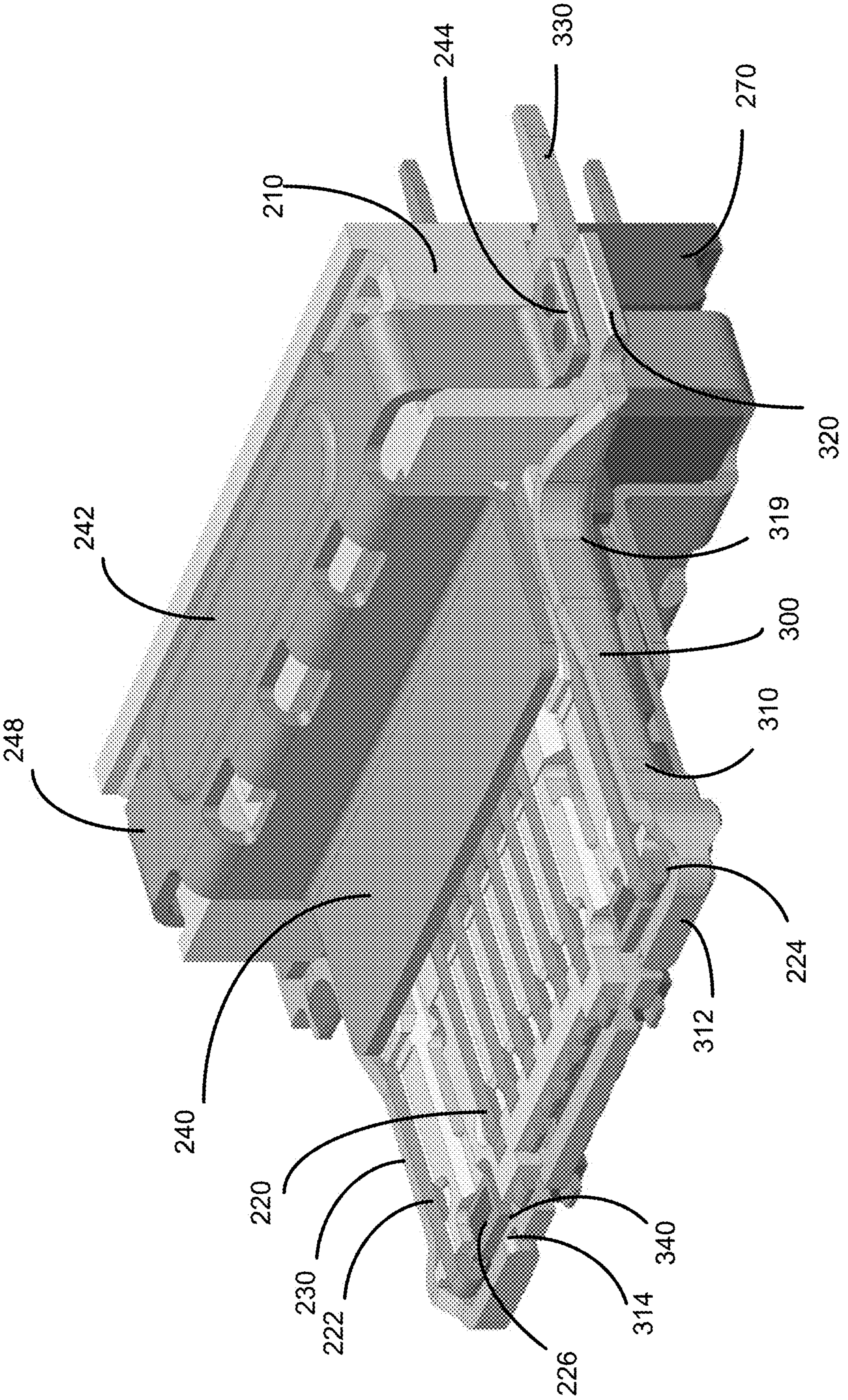
FIG. 4 illustrates a portion of the connector receptacle of FIG. 2.
Figure 5:
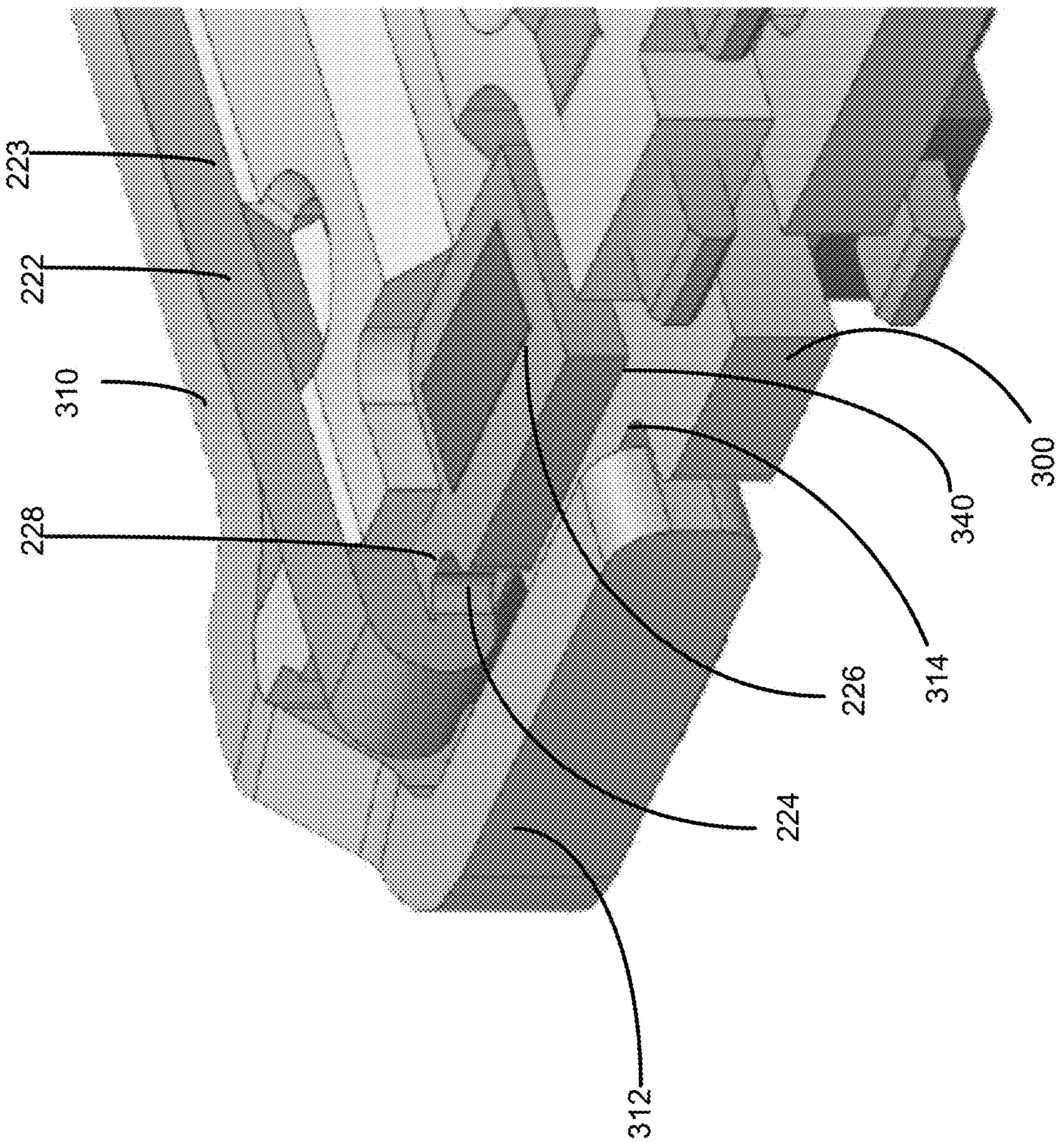
FIG. 5 illustrates a portion of connector receptacle of FIG. 2.

The inclusion of vertical portion 319 can increase the durability of tongue 230 of connector receptacle 200 by increasing its moment of inertia. Additional metal region 342 can be added to further strengthen center plate 300. To further protect a front edge 232 of tongue 230, extension portion 312 can be folded around and bonded, solder, welded, or otherwise attached to front edge 314 of center plate 300. Additionally, ground contacts 222 can include a connection plate 226. Connection plate 226 can be attached by soldering, laser welding, bonding, or other method to location 340 of center plate 300. An example is shown in FIG. 4 and FIG. 5.

Various center plates can be used in these and other embodiments of the present invention. For example, extension portions 312 can be extended further along a front edge 314 of center plate 300. Additional reinforcement can be added to additional metal region 342. Vertical portions 319 can be extended further along sides of center plate 300. For example, vertical portions 319 can extend to through-hole contacting portions 330. An example is shown in the following figure.

Figure 3B:
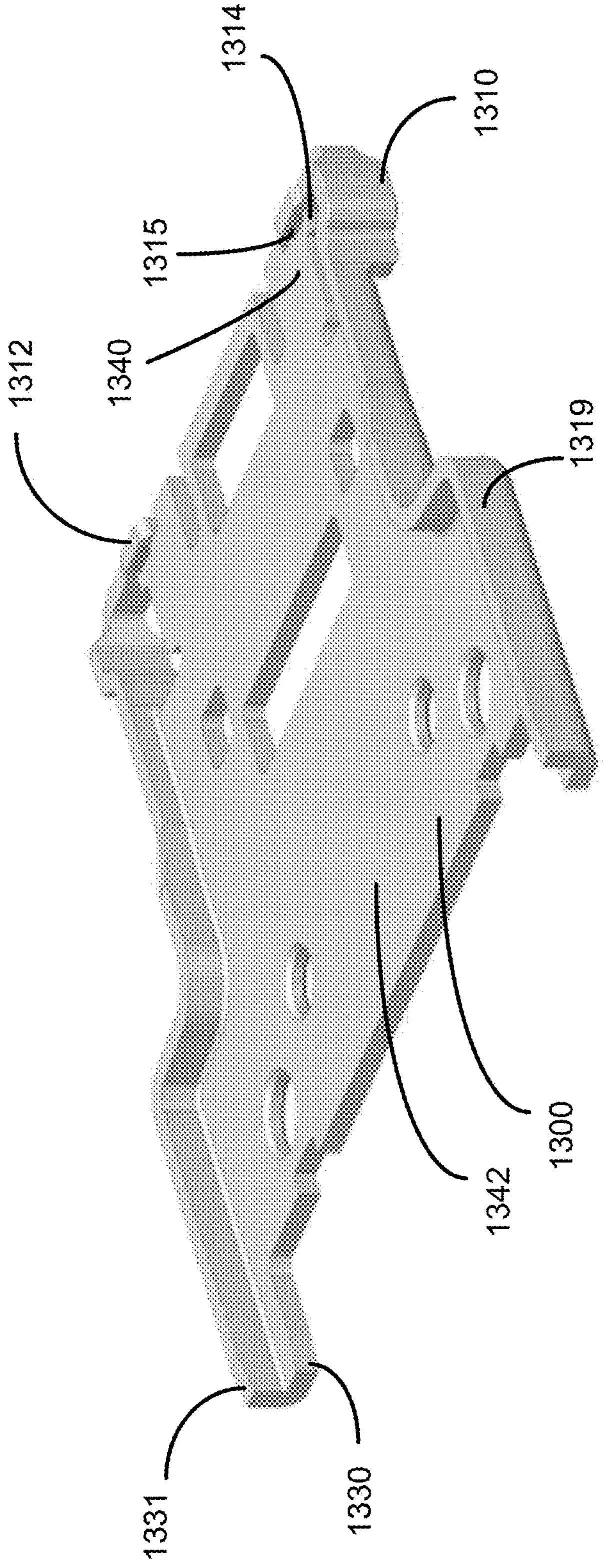
FIG. 3B illustrates another center plate according to an embodiment of the present invention.

FIG. 3B illustrates another center plate according to an embodiment of the present invention. Center plate 1300 can be similar to center plate 300 (shown in FIG. 3A) and corresponding features (those numbered without the leading "1") can be formed and used in the same manner as in center plate 300. Center plate 1300 can include vertical portions 1319 that extend along sides of center plate 1300 to surface-mount contacting portions 1330. This can further reinforce and strengthen surface-mount contacting portions 1330 and the rear portion of center plate 1300 around the additional metal region 1342. This reinforcement can have the additional benefit of allowing the additional metal region 1342 to be shorter, thereby enabling surface-mount contacting portions 1330 to be moved towards the front edge 1314. This can reduce a depth of base 260 of connector receptacle 200 (both shown in FIG. 3A.) The reduced depth of base 260 can allow connector receptacle 200 to be used in shallower openings in power adapter 100 or other electronic devices. The ability to be used in shallower openings can allow connector receptacle 200 to be used in applications that might not have otherwise been possible. Center plate 1300 can include vertical portions 1319. Vertical portions 1319 can increase the stiffness and toughness of center plate 1300 by increasing the moment of inertia of the center plate 1300.

Extending vertical portion 1319 to surface-mount contacting portions 1330 can consume the region used for side ground tabs 320 (shown in FIG. 3A) on center plate 300. This can make it difficult to attach top shielding 248 and bottom shielding 288 (both shown in FIG. 3A) to center plate 1300. But in power-only systems with low data rates, the additional shielding provided by top shielding 248 and bottom shielding 288 might not be needed. Also, during manufacturing, side ground tabs 320 can attach to a carrier. Accordingly, other portions of center plate 1300 can be attached to a carrier during manufacturing. For example, additional metal region 1342, or front edge 1314 can be attached to a carrier during manufacturing.

Center plate 1300 can be formed in various ways. For example, an outline of center plate 1300 can be stamped. Vertical portions 1319 can be formed as part of center plate 1300. That is, vertical portions 1319 and the other portions of center plate 1300 can be formed as a single, unitary piece. Alternatively, vertical portions 1319 can be formed separately from center plate 1300 and later joined to center plate 1300. For example, vertical portions 1319 can be formed by deep drawing or other plastic deformation process. When this is done, vertical portions 1319 can extend above center plate 1300 in an approximately orthogonal direction. Due to the nature of the deep drawing process, vertical portions 1319 might not extend substantially below center plate 1300. Vertical portions 1319 can be formed in other ways. For example, vertical portions 1319 can be formed by stamping, or other process. Vertical portions 1319 can be formed along a side of center plate 1300 by forging. Center plate 1300 and vertical portions 1319 can be formed by 3-D printing, metal-injection molding, computer-numerically machining, or other additive or forming process.

Where vertical portions 1319 are stamped, a limit on the ratio of the radius of the curved stamped portion to the thickness of center plate 1300 might limit the possible thickness of center plate 1300. By using a deep draw process, this limitation is not present and a thicker center plate 1300 can be used, resulting in a stronger tongue 230 for connector receptacle 200.

In this example, vertical portions 1319 can be formed by a deep drawing process. This deep drawing process can additionally rotate extension portion 1312 through a 90 degree right angle relative to a top surface of center plate 1300. Extension portion 1312 can be folded around to front edge 1314 by stamping or other process. In these and other embodiments of the present invention, extension portion 1312 can be stamped to be at a right angle to center plate 1300 by a step separate from the deep drawings of vertical portions 1319.

Center plate 1300 and vertical portions 1319 can be formed using various sequences of steps. For example, the openings in center plate 1300 can be stamped. An outline of center plate 1300 can be formed by stamping. Vertical portions 1319 can be formed by deep drawing. This step can also move extension portions 1312 to the vertical position. The extension portions 1312 can be folded against front edge 1314 of center plate 1300 and bonded, welded, soldered, or attached in other way at location 1315. Center plate 1300 can then be cut from a carrier (not shown.)

Vertical portions 1319 and center plate 1300 can be formed of various materials. For example, they can be formed of stainless steel, steel, copper, copper alloy, copper titanium, phosphor bronze, or other material or combination of materials. They can be plated or coated with nickel, gold, palladium-nickel, palladium or other material or combination of materials. Harder materials can be used to further improve the strength of the reinforced tongue, though cracking at any drawn portions can be avoided using softer materials.

Vertical portions 1319 and center plate 1300 can be symmetrical, that is the top and the bottom of center plate 1300 and vertical portions 1319 can be the same. Alternatively, center plate 1300 and vertical portions 1319 can be asymmetrical, that is, the top and bottom of center plate 1300 and vertical portions 1319 can be different. For example, where vertical portions 1319 are formed by deep drawing, vertical portions 1319 can extend along sides of a top of center plate 1300 while there can be an absence of corresponding vertical portions 1319 extending along a side of a bottom of center plate 1300. Where the reinforced tongue 230 is used in a power adapter 100 (shown in FIG. 1) that is plugged into a wall outlet (not shown) and connector receptacle 200 is on a side of power adapter 100 adjacent to the wall, force events can tend to pull tongue 230 away from the wall. In such a device, it can be beneficial to position vertical portions 1319 such that vertical portions 1319 tend to be in tension when a force event happens, thereby avoiding buckling that can occur if vertical portions 1319 are in compression. This can be achieved by having vertical portions 1319 facing the wall and away from the likely direction of the force event.

The inclusion of vertical portions 319 (shown in FIG. 3A) or 1319 can increase the durability of tongue 230 of connector receptacle 200. Additional metal region 1342 can be added to further strengthen center plate 300 or 1300. To further protect a front edge 232 of tongue 230, extension portions 312 (shown in FIG. 3A) or 1312 can be folded around and bonded, solder, welded, or otherwise attached to front edge 314 (shown in FIG. 3A) or 1314 of center plate 300 or 1300 at location 1315. Additionally, ground contacts 222 can include a connection plate 226. Connection plate 226 can be attached by soldering, laser welding, bonding, or other method to location 340 (shown in FIG. 3A) of center plate 300 or 1300. Further details using center plate 300 are shown in the following figures.

FIG. 4 illustrates a portion of the connector receptacle of FIG. 2. Contacts 220 and ground contacts 222 can be supported by sub-housing 210. Other contacts 220 and ground contacts 222 (not shown) can be supported on a bottom side of tongue 230 by sub-housing 270. Center plate 300 can include vertical portions 319. Extension portion 312 can extend from vertical portions 319 and be welded, bonded, soldered, or otherwise attached to front edge 314 of center plate 300. Extension portion 312 can further include side ground contacts 310. Top shield 248 can include ground plate 240, ground contact 242, and side ground tab 244. Side ground tab 244 can be welded, bonded, soldered, or otherwise attached to side ground tab 320 of center plate 300.

Ground contacts 222 can include contacting portions 223 exposed on tongue 230. Ground contacts 222 can further include second portions 224, which can be folded beneath the contacting portions 223. Connection plates 226 can extend from second portions 224. Connection plates 226 can be welded, bonded, soldered, or otherwise attached to center plate 300 at locations 340. The combination of connection plate 226 and extension portions 312 can reinforce a front edge 232 of tongue 230. These structures are shown further in the following figure.

FIG. 5 illustrates a portion of connector receptacle of FIG. 2. In this example, center plate 300 can include side ground contacts 310 and extension portion 312. Extension portion 312 can be folded around a front of center plate 300 and welded, soldered, bonded, or otherwise attached to a front edge 314. Ground contacts 222 can include contacting portions 223 exposed on a top side of tongue 230. Second portions 224 can be folded beneath the contacting portion 223 of ground contact 222. Connection plate 226 can extend from second portion 224. Connection plate 226 can be solder, bonded, laser welded, or otherwise attached to center plate 300 at location 340. These ground contacts 222 can provide a low-impedance path to ground through ground contacts 222 as well as center plate 300.

Again, vertical portions 319 can be formed separately from center plate 300 and then attached to center plate 300 using soldering, welding, bonding, or other technique. An example is shown in the following figure.

Figure 6:
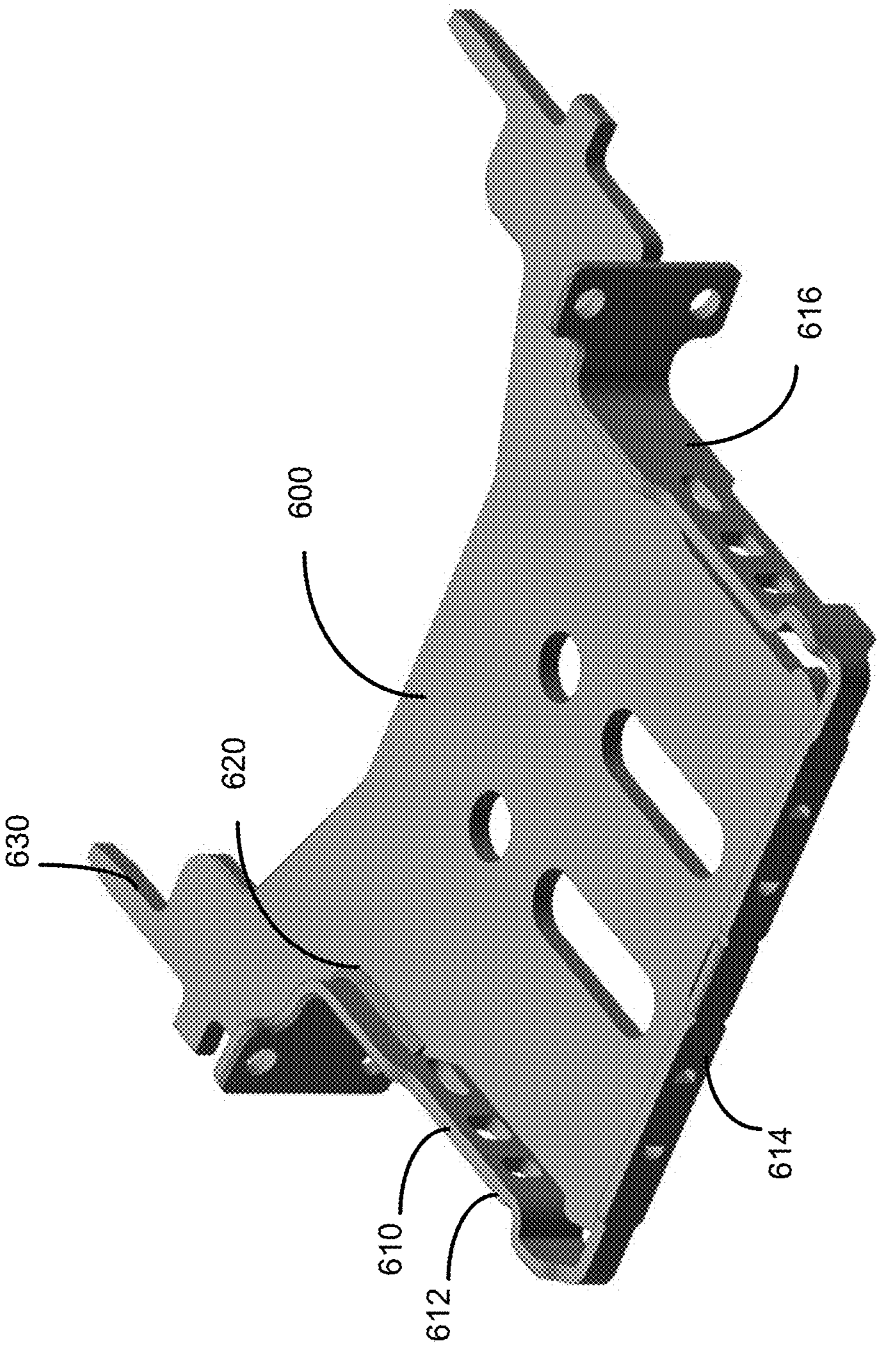
FIG. 6 illustrates a center plate that can be used in a connector receptacle according to an embodiment of the present invention.

FIG. 6 illustrates a center plate that can be used in a connector receptacle according to an embodiment of the present invention. Center plate 600 can include through-hole contacting portions 630. Through-hole contacting portions 630 can be inserted and soldered to openings in a printed circuit board or other appropriate substrate (not shown.) Vertical portions 610 can include side ground contacts 612 and front portion 614 as well as side portions 616. Front portion 614 and side portions 616 can be soldered, bonded, welded, or otherwise attached to center plate 600 at locations 620. In this way, vertical portions 610 can provide reinforcement for a tongue incorporating center plate 600. Front portion 614 can further reinforce the tongue and provide reinforcement for a front edge of the tongue.

While embodiments of the present invention are well-suited for use in power adapters such as power adapter 100, these and other embodiments of the present invention can be used in other power adapters and other electronics devices as well. For example, embodiments of the present invention can provide connector receptacles that can be located in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, accessories for these devices, and other devices. Also, while embodiments of the present invention are well-suited for use in a Universal Serial Bus (USB) USB Type-C connector, these and other embodiments of the present invention can provide interconnect pathways for signals that are compliant with various standards such as other USB standards, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Power adapter 100 (shown in FIG. 1) can receive power at an AC connector (not shown) from a power outlet (not shown.) The AC connector can provide power through a fuse (not shown) to a series of chokes, where the series of chokes reduces power supply noise. The series of chokes can be housed in a space-efficient choke module, such as choke module 1000 shown below in FIG. 10. Choke module 1000 can then provide an output through circuitry (not shown), including a rectifier and a filter, to a transformer, such as transformer module 800 shown below in FIG. 9A. After the transformer, the power can be converted to a DC power supply and provided on power pins of connector receptacle 200, shown above. An example of such a transformer module is shown in the following figures.

Figure 7:
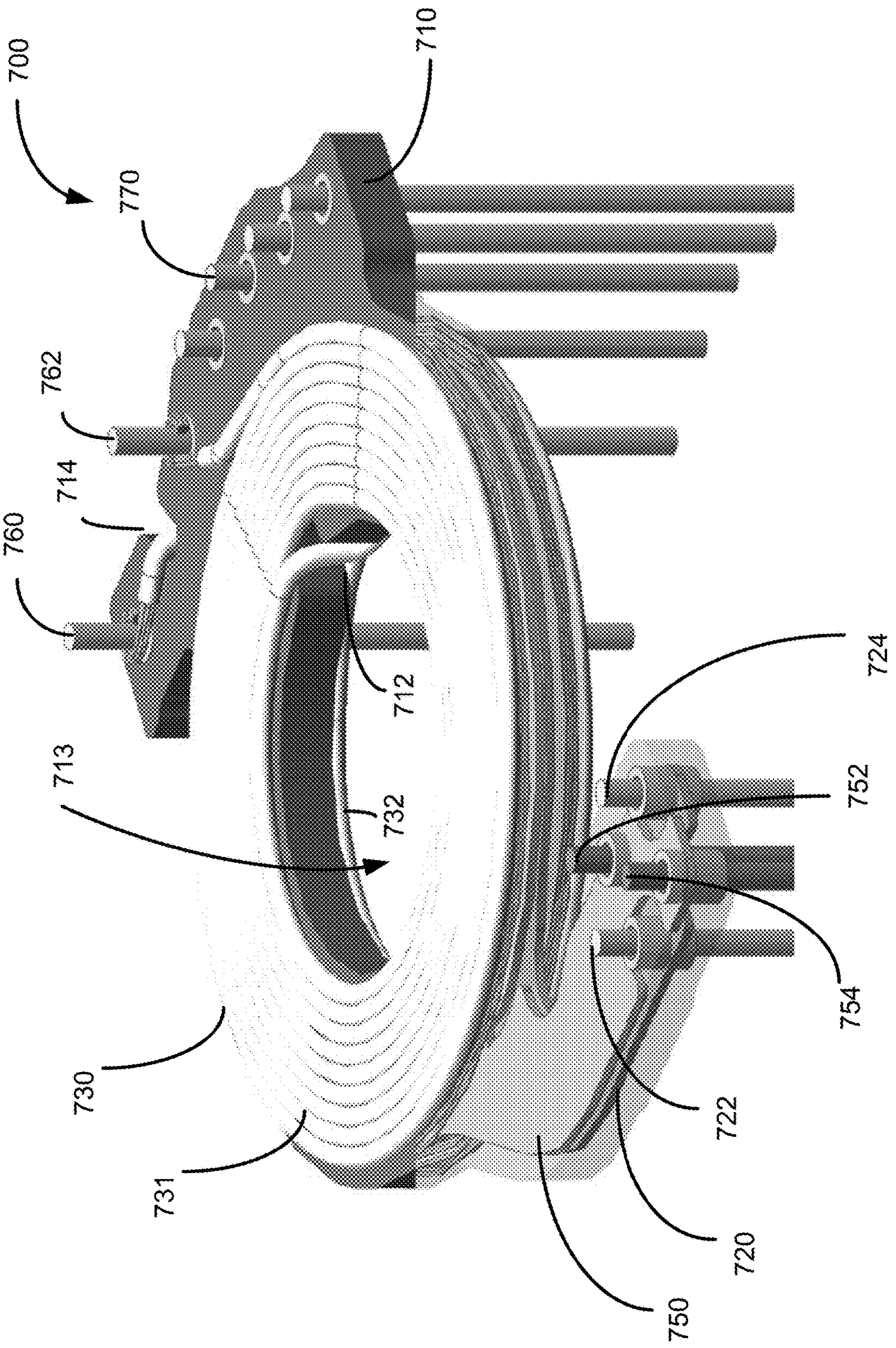
FIG. 7 illustrates a printed circuit board assembly for a transformer module according to an embodiment of the present invention.

FIG. 7 illustrates a printed circuit board assembly for a transformer module according to an embodiment of the present invention. Printed circuit board assembly 700 can include printed circuit board 710 supporting coiled wire 730. Printed circuit board 710 can have a roughly annular shape, that is, circular with central opening 713. Printed circuit board assembly 700 can include a first winding formed by wire 730 and a second winding formed by metallization or etched portion 720 and metallization or etched portion 750 on layers of printed circuit board 710. Metallization or etched portion 720 and metallization or etched portion 750 can be formed by metalizing patterns on layers of the printed circuit board, metallization or etched portion 720 and metallization or etched portion 750 can be formed by etching metal layers of a printed circuit board, or metallization or etched portion 720 and metallization or etched portion 750 can be formed in other ways. In this example, the first winding formed by wire 730 can be a primary winding, while the second winding formed by metallization or etched portion 720 and metallization or etched portion 750 can be a secondary winding, though in these and other embodiments of the present invention, the first winding formed by wire 730 can be a secondary winding, while the second winding formed by metallization or etched portion 720 and metallization or etched portion 750 can be a primary winding.

The primary winding can receive power from a choke module, such as choke module 1000 as shown below, via circuitry such as a rectifier and a filter (not shown.) As such, the primary winding can be a high voltage low current winding. The secondary winding can provide a lower voltage high-current power supply to other circuits in power adapter 100 (shown in FIG. 1) or other electronic device. To handle the higher current of the secondary winding, the metallization or etched portion 720 and metallization or etched portion 750 on printed circuit board 710 forming the secondary winding can be wide and be formed using thick metal layers.

The first or primary winding can be formed by wire 730. Wire 730 can connect to terminal 762 and be wrapped in loops to form coil 731 in the counterclockwise direction (as drawn) towards central opening 713 in printed circuit board 710. When wire 730 reaches notch 712, wire 730 can transition to a bottom side of printed circuit board 710 and be wrapped in clockwise (as drawn) loops to form coil 732 until the perimeter of printed circuit board 710 is reached. Wire 730 can then be routed through notch 714 where it can be soldered to terminal 760. In these and other embodiments of the present invention, wire 730 can be coiled starting at terminal 760. Coiled wire 730 can be self-bonding to help keep the loops forming coil 731 and coil 732 in place during manufacturing and use. An adhesive (not shown) on the surface of the wire can be heat activated and used to fix adjacent loops of wire together to form coil 731 and coil 732 and to fix coil 731 and coil 732 to the surfaces of printed circuit board 710. The coiled wire 730 can be a Litz wire.

The secondary winding can be formed by metallization or etched portion 750 and metallization or etched portion 720 on layers of printed circuit board 710. Metallization or etched portion 750 can be connected to terminal 752 and terminal 754. Metallization or etched portion 720 can be connected to terminal 722 and terminal 724. Terminal 752, terminal 754, terminal 722, and terminal 724 can be interleaved to help to reduce differential noise in the secondary winding. Also, using two terminals for each end of the secondary winding can reduce the series impedance, which can further help to reduce electromagnetic noise and improve efficiency. One or more cancellation shields can be included on layers of printed circuit board 710. For example, a top cancellation shield 790 can be positioned between metallization or etched portion 750 of the secondary winding and top coil 731 of the primary winding. Similarly, a bottom cancellation shield 791 (shown in FIG. 9B) can be positioned between metallization or etched portion 720 of the secondary winding and bottom coil 732 of the primary winding. The top cancellation shield 790 and the bottom cancellation shield 791, along with low-voltage traces 792 and low-voltage traces 793 (both shown in FIG. 9B) can be connected to terminals 770.

In this example, notch 712 can be used to transition wire 730 from top coil 731 to bottom coil 732. Notch 712 can replace vias through printed circuit board 710, which could otherwise add resistance to the primary winding. Notch 712 further allows a height of printed circuit board assembly 700 to be reduced by a wire thickness since wire 730 does not need to cross over or under top coil 731 to reach bottom coil 732.

More specifically, using a single wire for both top coil 731 and bottom coil 732 can help to reduce the impedance of the primary winding. Also, notch 712 and notch 714 in the printed circuit board can provide efficient transitions from the top surface of printed circuit board 710 to the bottom surface of the printed circuit board 710. Notch 712 can be used to route the single wire from the top surface of printed circuit board 710 to the bottom surface of printed circuit board 710. Notch 714 can be used for single wire 730 to return to the top surface of printed circuit board 710. Alternatively, top coil 731 and bottom coil 732 could be joined by a first interconnect (not shown), such as first vias in printed circuit board 710, and bottom coil 732 could be attached to the top surface of printed circuit board by a second interconnect (not shown), such as second vias in printed circuit board 710. But the addition of these interconnects could increase impedance in the primary winding, which could reduce efficiency. Top coil 731 and bottom coil 732 could alternatively be joined by routing single wire 730 through central opening 713, but that could widen printed circuit board assembly 700 by a width of wire 730. Bottom coil 732 could return to the top surface of printed circuit board 710 by routing single wire 730 outside of printed circuit board 710, but again that could widen printed circuit board assembly 700 by a width of wire 730. Wire 730 could alternatively be routed over or under one or both of coil 731 and coil 732, but this could increase the height of printed circuit board assembly 700 by one or more widths of wire 730.

Figure 8:
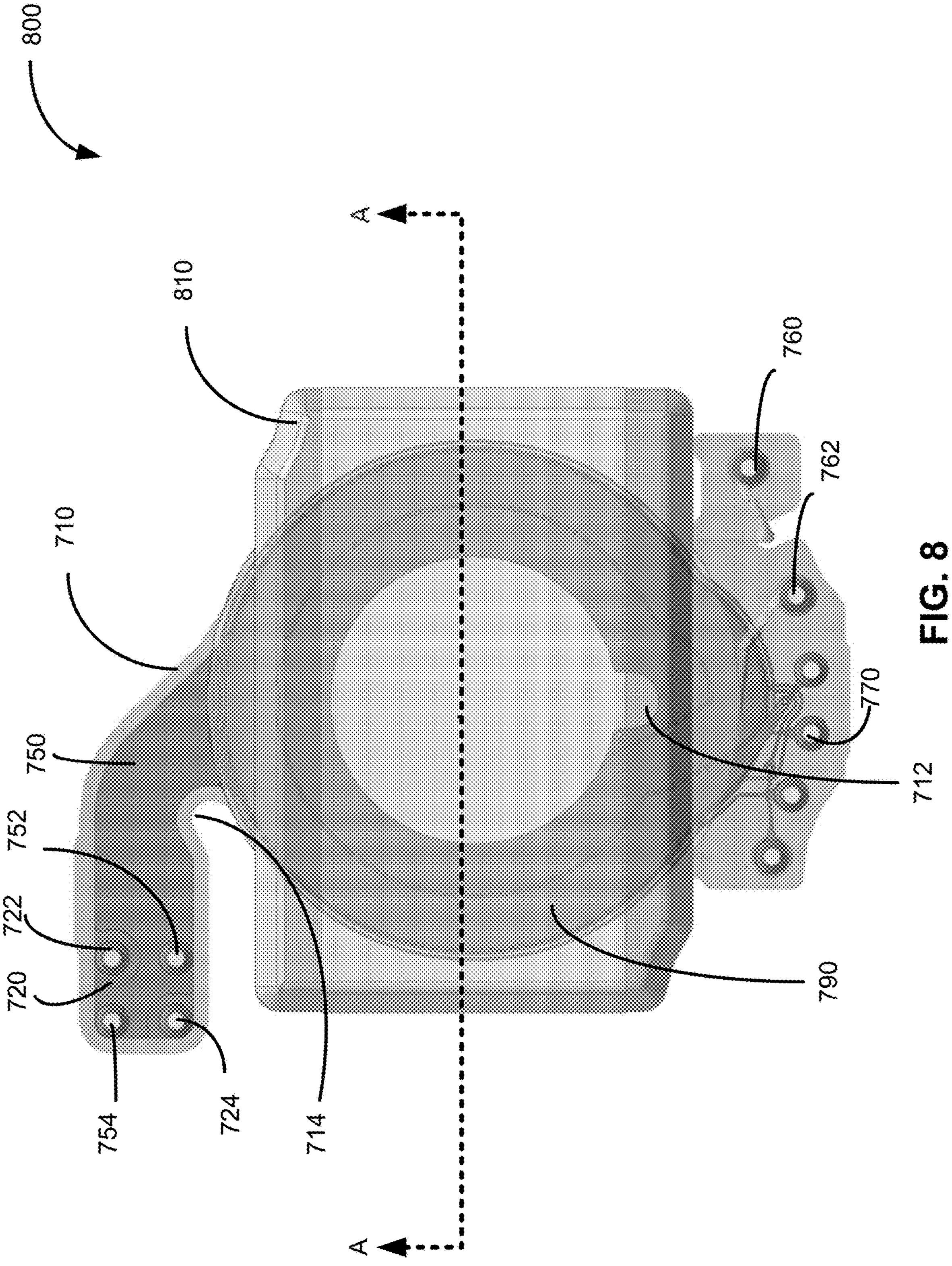
FIG. 8 illustrates a portion of a transformer module according to an embodiment of the present invention.

FIG. 8 illustrates a portion of a transformer module according to an embodiment of the present invention. Transformer module 800 can include printed circuit board 710 and core 810. Printed circuit board 710 can include metallization or etched portion 750 and metallization or etched portion 720, which can form a secondary winding. Metallization or etched portion 750 can be connected to terminal 752 and terminal 754. Metallization or etched portion 720 can be connected to terminal 722 and terminal 724. Terminal 722, terminal 724, terminal 752, and terminal 754 can be interleaved to help reduce differential noise in the secondary winding. Again, using two terminals for each end of the secondary winding can reduce the series impedance, which can further help to reduce electromagnetic noise and improve efficiency. Printed circuit board 710 can further include notch 714 and notch 712 to facilitate the routing of wire 730 (shown in FIG. 7) for the formation of the primary winding. The primary winding can connect to terminal 760 and terminal 762. Top cancellation shield 790 and bottom cancellation shield 791 (shown in FIG. 9B) can be included in printed circuit board 710. Top cancellation shield 790 and bottom cancellation shield 791, along with low-voltage traces 792 and low-voltage traces 793 (both shown in FIG. 9B) can be connected to the four terminals 770.

By forming the primary winding from a single wire 730 wound in a single group of loops or coil 731 on a top surface of the printed circuit board and a single group of loops or coil 732 on the bottom of the printed circuit board 710, the primary winding can be made in a consistent, repeatable, well controlled manner. Similarly, by printing the secondary winding as metallization or etched portion 720 and metallization or etched portion 750 on layers of the printed circuit board, the secondary winding can also be made in a consistent, repeatable, well controlled manner. This can improve the efficiency of transformer module 800 and reduce an amount of electromagnetic interference that can otherwise be generated. The configuration of a secondary winding within coil 731 and coil 732 of a primary winding can be referred to as an interleaved configuration. This interleaving can help to reduce AC losses, that is, it can reduce eddy currents in the transformer.

Core 810 can partially surround printed circuit board 710. Core 810 can be made of a ferrite, nanocrystalline, or other material. Further details of core 810 are shown in the following figure.

Figure 9A:
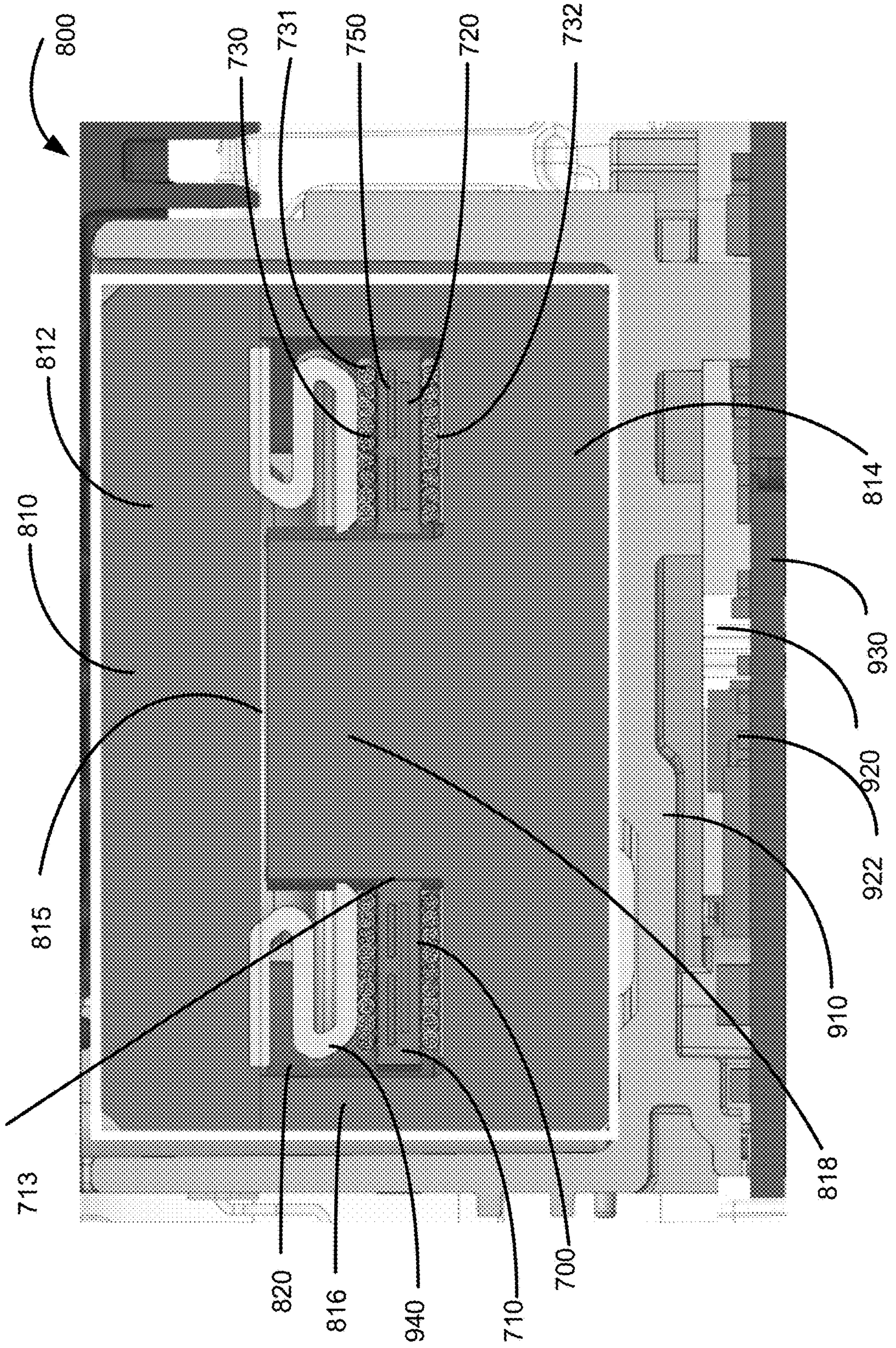
FIG. 9A is a cross-section of a transformer module according to an embodiment of the present invention.

FIG. 9A is a cross-section of a transformer module according to an embodiment of the present invention. The cross-section in this figure is taken along line A-C in FIG. 8. Transformer module 800 can provide a large amount of power while having a small form factor by providing a space efficient transformer having thermal dissipation components. Transformer module 800 can include printed circuit board assembly 700. Printed circuit board assembly 700 can include printed circuit board 710 and wire 730 formed as top coil 731 and bottom coil 732. Printed circuit board 710 can include metallization or etched portion 750 and metallization or etched portion 720. Transformer module 800 can further include core 810. Core 810 can include top portion 812, bottom portion 814, and side portions 816. Side portions 816 can join top portion 812 to bottom portion 814 of core 810. Core 810 can further include central portion 818 which can pass through central opening 713 in printed circuit board assembly 700. Airgap 815 can be positioned between top portion 812 and central portion 818 of core 810.

Printed circuit board assembly 700 can have a low height. This low height can be achieved by wrapping wire 730 into top coil 731 and bottom coil 732. Top coil 731 and bottom coil 732 can be arranged in a planar fashion and be routed through notch 712 and notch 714 (both shown in FIG. 7), thereby reducing the height of printed circuit board assembly 700. This reduced height can leave room for space 820 in core 810. Space 820 can be at least partially filled with a thermally conductive material to help remove heat from printed circuit board assembly 700.

The thermally conductive material can be formed as thermally conductive element 940. In this example, thermally conductive element 940 can have an S-shaped cross-section, though in other embodiments of the present invention, thermally conductive element 940 can have other shapes, such as a C, an X, an O, or other compressible-shaped cross-section. Having a compressible-shaped cross-section can help to ensure a good thermal connection between printed circuit board assembly 700 (or more specifically coil 731 on a top surface of printed circuit board 710) and a top portion 812 of core 810. Thermally conductive element 940 can be formed of various materials. For example, thermally conductive element 940 can be formed of silicone, room-temperature-vulcanizing silicone, epoxy, aluminum oxide, polyurethane, or other material or combination of these and other materials. Thermally conductive element 940 can be assembled in compression to form a good thermal connection between printed circuit board assembly 700 and core 810, thereby reducing local heating in transformer module 800. Space 820 between coil 731 on the top surface of printed circuit board 710 and top portion 812 of core 810 can also help to provide a greater distance from airgap 815 of core 810 to printed circuit board assembly 700. This distance can help to prevent heating caused by the flux in airgap 815 from reaching printed circuit board assembly 700.

Core 810 can be housed in an insulative housing 910. Insulative housing 910 can be mounted on printed circuit board 930. Space 920 can be positioned between insulative housing 910 and printed circuit board 930 to help cool the transformer module 800 and to provide room for additional surface-mount devices and other components 922. Additional thermally conductive material and structures (not shown) can be placed over, under, or around transformer module 800. The thermally conductive material and structures can be elastomers, sheets of graphite, or other material. The use of elastomers or sheets of graphite can help to reduce the amount of thermal glues or silicones that might be necessary. Eliminating or reducing thermal glues or silicones can enable better inspection, reworking, and repairs of power adapter 100 (shown in FIG. 1) or other electronic device. Eliminating or reducing thermal glues or silicones can also allow for the reuse and recycling of modules or portions of power adapter 100 or other electronic device. Also, thermal glues and silicones can often be applied in an inconsistent manner during manufacturing. Using elastomers or sheets of graphite can help to improve the repeatability of the thermal performance of power adapter 100.

Transformer module 800 can be positioned such that any acoustic noise generated by the coils of the transformer does not couple, or has limited coupling, to portions of enclosure 110 (shown in FIG. 1) of power adapter 100 or other electronic device. For example, coil 731 and coil 732 can be positioned laterally in power adapter 100, where the lateral direction is through the widest part of enclosure 110. For example, coil 731 and coil 732 can be positioned laterally or parallel to the dimension 142 or dimension 144 (both shown in FIG. 1.) Acoustic noise can further be reduced since as coil 731 and coil 732 of the primary winding are adhered together and to printed circuit board 710 and therefore less able to vibrate.

Figure 9B:
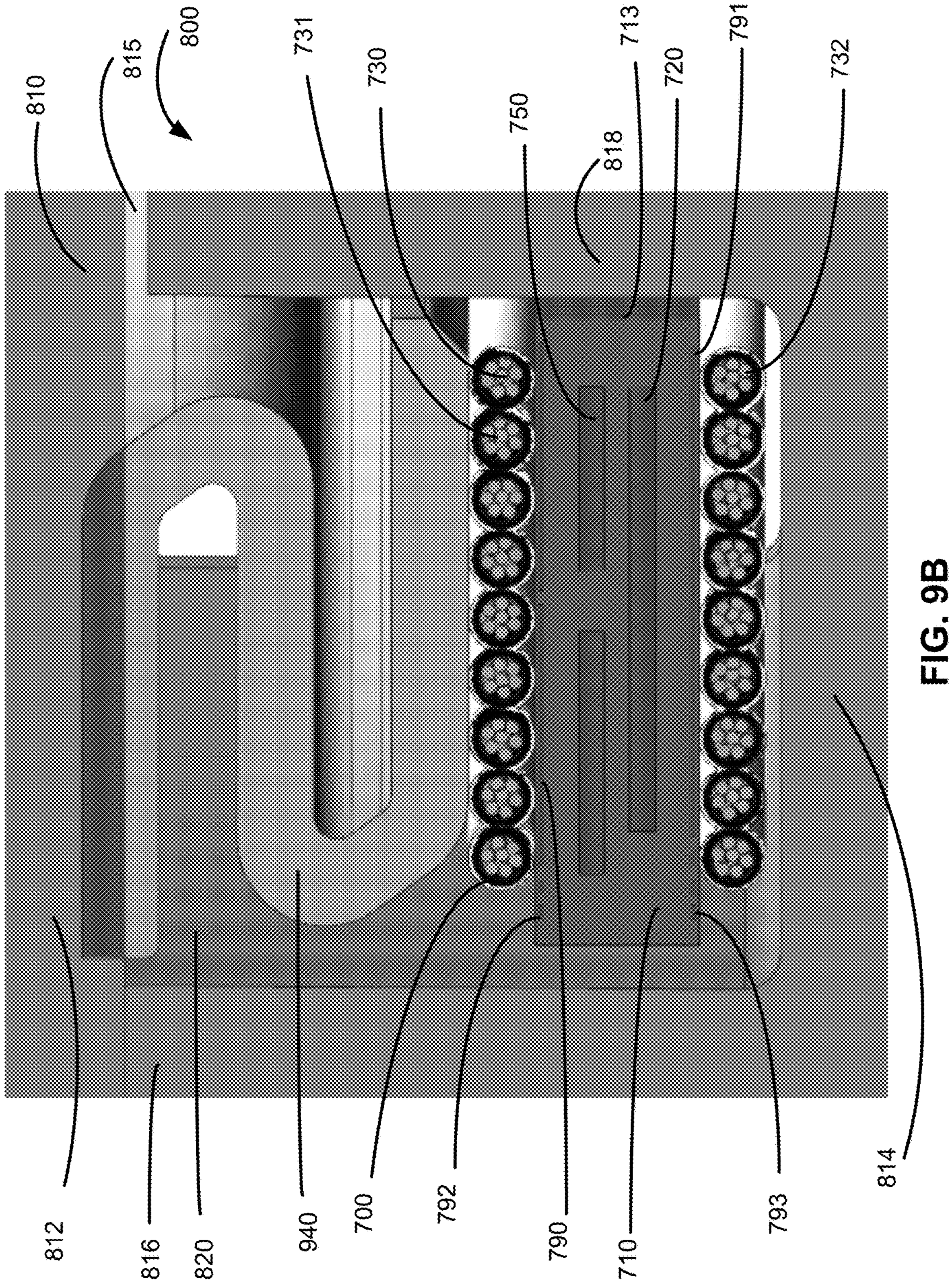
FIG. 9B illustrates a more detailed view of a portion of a transformer module according to an embodiment of the present invention.

FIG. 9B illustrates a more detailed view of a portion of a transformer module according to an embodiment of the present invention. The cross-section in this figure is taken along line A-B in FIG. 8. Transformer module 800 can include printed circuit board assembly 700. Printed circuit board assembly 700 can include printed circuit board 710 and wire 730 formed as top coil 731 and bottom coil 732. Printed circuit board 710 can include metallization or etched portion 750 and metallization or etched portion 720. Printed circuit board 710 can further include top cancellation shield 790 and bottom cancellation shield 791. Top cancellation shield 790 can be between top coil 731 and metallization or etched portion 750, while bottom cancellation shield 791 can be between bottom coil 732 and metallization or etched portion 720. Printed circuit board 710 can further include low-voltage traces 792 on a layer with or near top cancellation shield 790, and low-voltage traces 793 on a layer with or near bottom cancellation shield 791. These low-voltage traces can provide power for additional surface-mount devices and other components 922 (shown in FIG. 9B.) These low-voltage traces 792 and low-voltage traces 793 can be on the primary side of transformer module 800.

Transformer module 800 can further include core 810. Core 810 can include top portion 812, bottom portion 814, and side portions 816. Side portions 816 can join top portion 812 to bottom portion 814 of core 810. Core 810 can further include central portion 818 which can pass through central opening 713 in printed circuit board assembly 700. Airgap 815 can be positioned between top portion 812 and central portion 818 of core 810. Space 820 can be at least partially filled with a thermally conductive material to help remove heat from printed circuit board assembly 700. The thermally conductive material can be formed as thermally conductive element 940.

While embodiments of the present invention are well-suited for use in power adapters such as power adapter 100, these and other embodiments of the present invention can be used in other power adapters and other electronics devices as well. For example, embodiments of the present invention can provide printed circuit assemblies, transformer modules, and other components that can be located in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, accessories for these devices, and other devices.

Power adapter 100 can receive power at an AC connector (not shown) from a power outlet (not shown.) Power at the AC connector can be provided through a fuse (not shown) to a series of chokes, where the series of chokes reduces power supply noise. The series of chokes can be housed in a space-efficient choke module, such as choke module 1000 (shown in FIG. 10.) The choke module can then provide an output through circuitry (not shown), including a filter and rectifier, to a transformer, such as transformer module 800. After the transformer, the power can be converted to a DC power supply and provided on power pins of connector receptacle 200, also shown above. An example of such a choke module is shown in the following figures.

Figure 10:
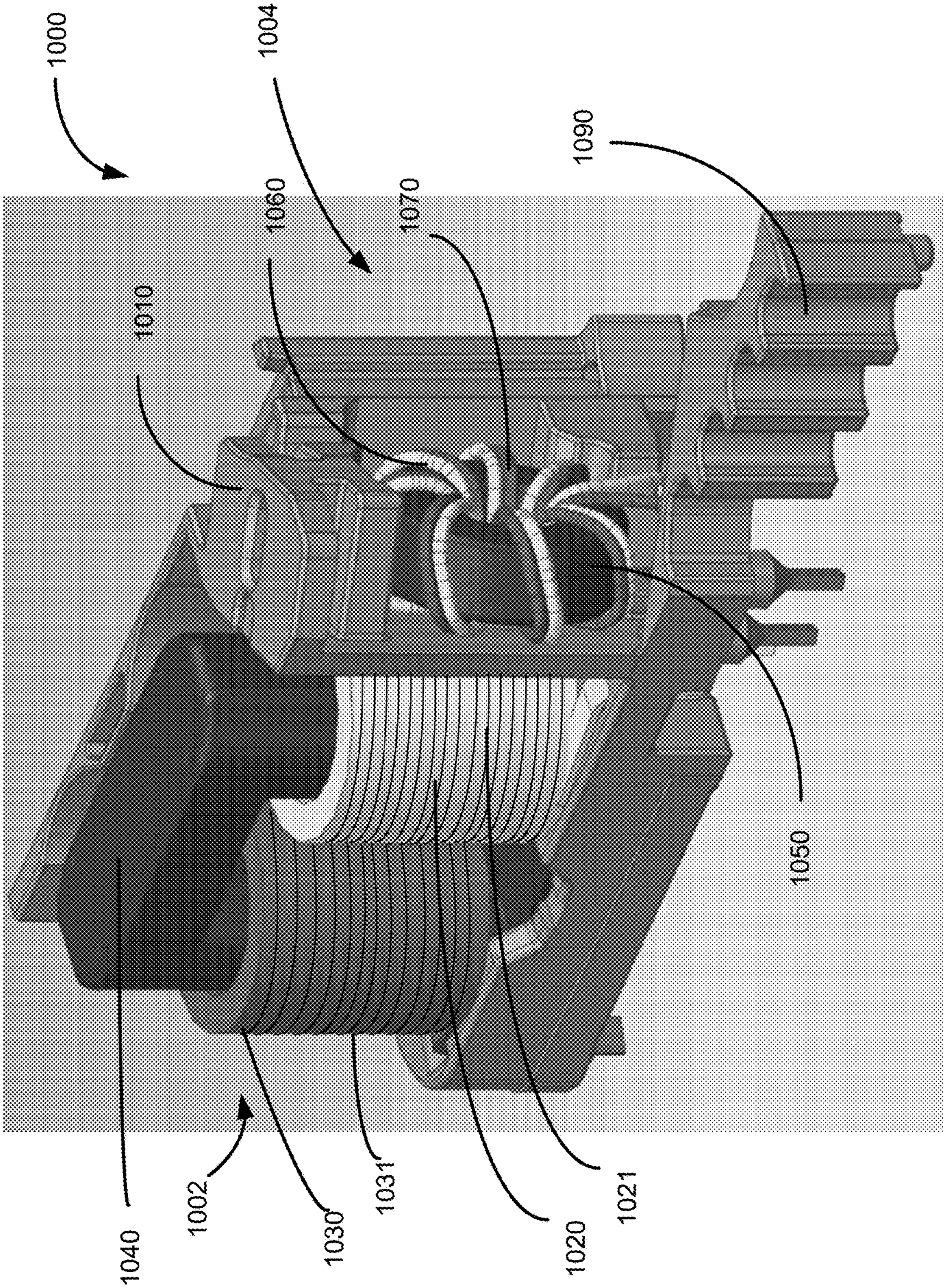
FIG. 10 illustrates a choke module according to an embodiment of the present invention.

FIG. 10 illustrates a choke module according to an embodiment of the present invention. Choke module 1000 can include a low-frequency choke 1002 (CMC) and a high-frequency choke 1004 connected in series, though in these and other embodiments of the present invention, choke 1002 can be a high-frequency choke, while choke 1004 can be a low-frequency choke. In these and other embodiments of the present invention, choke 1002 can be a common-mode choke or a differential-mode choke, and choke 1004 can be a common-mode choke or a differential-mode choke. In these and other embodiments of the present invention, low-frequency choke 1002 can be coupled to receive power. Low-frequency choke 1002 can receive power from a fuse (not shown) positioned between an AC connector (not shown) and the low-frequency choke 1002, and low-frequency choke 1002 can provide an output to high-frequency choke 1004. In these and other embodiments of the present invention, high-frequency choke 1004 can receive power from the fuse and high-frequency choke 1004 can provide an output to low-frequency choke 1002.

Low-frequency choke 1002 can be formed by a first wire 1020, a second wire 1030, and core 1040. First wire 1020 and second wire 1030 can be wrapped or wound around legs of core 1040. A first return length of wire (not shown) can extend downward along an outside surface for first wire 1020, and a second length of wire (not shown) can extend downward along an outside surface for second wire 1030. Core 1040 can be a rectangular core. Rectangular core 1040 can be formed by two C or U-shaped cores put together. Core 1040 can be formed of ferrite, nanocrystalline, or other material.

First wire 1020 and second wire 1030 can be flat wires. That is, they can have a substantially flat cross-section. First wire 1020 and second wire 1030 can have a rectangular, square, or other shaped cross-section. Alternatively, first wire 1020 and second wire 1030 can have round, oval, or other shaped cross-section. Utilizing flat, rectangular, or square wire can help to reduce the series impedance of the coils or windings, as well as improve the alignment and consistency or repeatability of the loops forming coil 1021 formed by first wire 1020 and the loops forming coil 1031 formed by second wire 1030. This reduced impedance, improved alignment, and improved repeatability can lead to improved performance including a reduced amount of electromagnetic noise and improved common-mode coupling.

Core 1040 can be protected with a layer of epoxy, enamel, or other insulative material. This insulative material can help to prevent shorts between first wire 1020 and second wire 1030 through core 1040. Utilizing flat wires for first wire 1020 and second wire 1030 can allow an airgap to be maintained between first wire 1020 and its leg of core 1040 and between second wire 1030 and its leg of core 1040. This additional airgap can further help to prevent electrical shorts between first wire 1020 and second wire 1030 through core 1040. Epoxy, wire enamel, or other material can be placed on the first wire 1020 and second wire 1030 before or during winding into coil 1021 and coil 1031 respectively, to prevent current from flowing between loops and bypassing or not flowing through portions of coil 1021 and coil 1031. Epoxy, wire enamel, or other material can be over the coil 1021 and coil 1031 to help to reduce any acoustic noise.

Choke module 1000 can further include a high-frequency choke 1004. The high-frequency choke 1004 can include substantially adjacent first wire 1060 and second wire 1070. These wires can be wrapped around toroid core 1050. Toroid core 1050 can be formed of ferrite, nanocrystalline, or other material. First wire 1060 and second wire 1070 can have a round, oval, or other shaped cross-section. First wire 1060 and second wire 1070 can be Litz wires. First wire 1060 and second wire 1070 can have a flattened, rectangular, or square cross-section. First wire 1060 and second wire 1070 can be approximately adjacent, though they can share a common insulation layer, be held together by an adhesive, or otherwise formed to be adjacent windings around core 1050.

Choke module 1000 can further include housing 1010. Housing 1010 can support low-frequency choke 1002 and high-frequency choke 1004 in a space efficient manner. Choke module 1000 can include support feature 1090. Support feature 1090 can arrange and support various wires, capacitors, and other components in power adapter 100 (shown in FIG. 1) or other electronic device.

Figure 11:
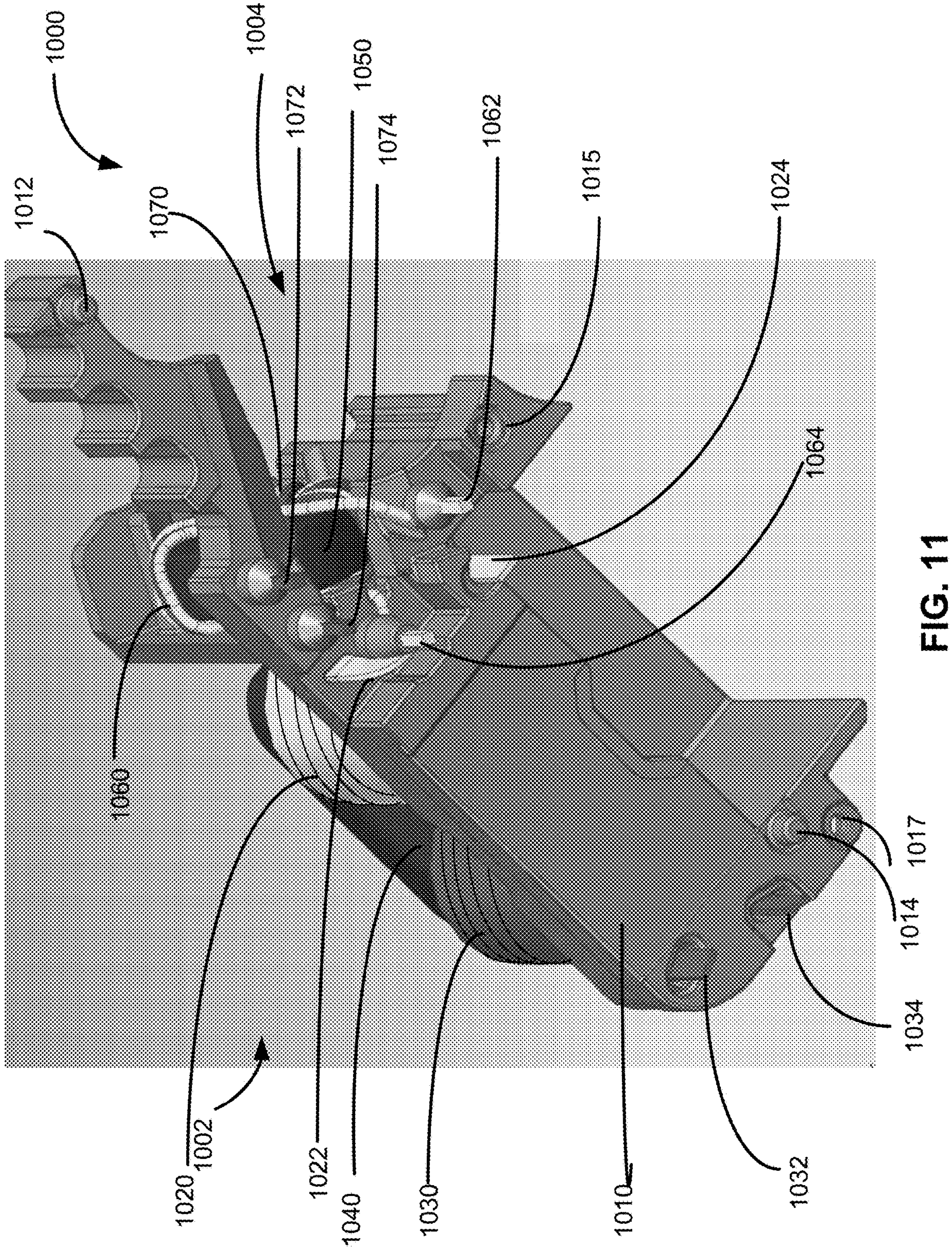
FIG. 11 illustrates an underside view of the choke module of FIG. 10.

FIG. 11 illustrates an underside view of the choke module of FIG. 10. Choke module 1000 can include a low-frequency choke 1002 and a high-frequency choke 1004. Low-frequency choke 1002 can include first wire 1020 and second wire 1030 around rectangular core 1040. First wire 1020 can terminate in end 1022 and end 1024. Second wire 1030 can terminate in end 1032 and end 1034. End 1024, end 1032, and end 1034 can be supported by housing 1010 sufficiently such that they can be used as contacting portions inserted into openings on a printed circuit board, or into an insulative housing and then into a printed circuit board or other appropriate substrate (not shown.)

High-frequency choke 1004 can include first wire 1060 and second wire 1070 wrapped around toroid core 1050. First wire 1060 can terminate in contact 1062 and contact 1064. Second wire 1070 can terminate in contact 1072 in contact 1074.

In these and other embodiments of the present invention, connections between low-frequency choke 1002 and high-frequency choke 1004 can be made at housing 1010. This can help to reduce the number of connections that need to be made in the printed circuit board or other appropriate substrate on which choke module 1000 is mounted. For example, end 1022 can be directly connected to contact 1064. This connection can reduce the number of connections to a printed circuit board that are needed. This can save space on the printed circuit board and make routing paths available for other signals or power supplies.

Housing 1010 can include tab 1012 and tab 1014, as well as notch or opening 1015 and notch or opening 1017 for alignment to features on an insulative structure (not shown.) The insulative structure can then be mounted on the printed circuit board or other appropriate substrate. A top thermal elastomer or graphite (not shown) can be placed over choke module 1000, while a bottom thermal elastomer or graphite (not shown) can be under the printed circuit board. The use of elastomers or sheets of graphite can help to reduce the amount of thermal glues or silicones that might be necessary. Eliminating or reducing thermal glues or silicones can enable better inspection, reworking, and repairs of power adapter 100 (shown in FIG. 1) or other electronic device. Eliminating or reducing thermal glues or silicones can also allow for the reuse and recycling of modules or portions of power adapter 100 or other electronic device. Also, thermal glues and silicones can often be applied in an inconsistent manner during manufacturing. Using elastomers or sheets of graphite can help to improve the repeatability of the thermal performance of power adapter 100.

While embodiments of the present invention are well-suited for use in power adapters such as power adapter 100, these and other embodiments of the present invention can be used in other power adapters and other electronics devices as well. For example, embodiments of the present invention can provide chokes, choke modules, and other components that can be located in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, accessories for these devices, and other devices.

In various embodiments of the present invention, center plates, shields, contacts, and other conductive portions of a power adapter or other electronic device can be formed by stamping, metal-injection molding, machining, micro-machining, 3-D printing, or other manufacturing process. The conductive portions can be formed of stainless steel, steel, copper, copper alloy, copper titanium, phosphor bronze, or other material or combination of materials. They can be plated or coated with nickel, gold, palladium-nickel, palladium or other material or combination of materials. The nonconductive portions, such as the housing and other structures can be formed using insert or other molding, 3-D printing, machining, or other manufacturing process. The nonconductive portions can be formed of silicon or silicone, rubber, hard rubber, plastic, nylon, liquid-crystal polymers (LCPs), ceramics, or other nonconductive material or combination of materials. The printed circuit boards used can be formed of FR-4 or other material.

Embodiments of the present invention can provide connector receptacles, transformers, and chokes that can be located in various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, accessories for these devices, and other devices. The connector receptacles can provide interconnect pathways for signals that are compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention can provide connector receptacles that can be used to provide a reduced set of functions for one or more of these standards. In various embodiments of the present invention, these interconnect paths provided by these connector receptacles can be used to convey power, ground, signals, test points, and other voltage, current, data, or other information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector comprising:

a housing; and a tongue comprising:

a center plate extending through the housing to a front edge of the tongue and laterally through the tongue and having a top surface and a bottom surface, the center plate comprising a vertical portion, the vertical portion extending orthogonally from the top surface and above the top surface of the center plate, wherein the vertical portion is absent below the bottom surface of the center plate;

a first plurality of contacts having contacting surfaces extending towards the front edge of the tongue and over the top surface of the center plate, the first plurality of contacts supported by the housing;

a first sub-housing supporting the first plurality of contacts;

a second plurality of contacts having contacting surfaces extending towards the front edge of the tongue and below the bottom surface of the center plate, the second plurality of contacts supported by the housing; and a second sub-housing supporting the second plurality of contacts.

2. The connector of claim 1 further comprising an extension portion extending from the vertical portion, where the extension portion extends around and is attached to the front edge of the tongue.

3. The connector of claim 2 wherein the extension portion forms a side ground contact on the tongue.

4. The connector of claim 3 wherein the vertical portion is formed by deep drawing.

5. The connector of claim 4 wherein the first plurality of contacts comprises a first ground contact, the first ground contact having a first portion including a contacting surface extending towards the front edge of the tongue and having a second portion folded below the first portion, the first ground contact having a connection plate extending parallel to the front edge of the tongue from the second portion, the connection plate attached to the center plate.

6. The connector of claim 5 further comprising:

a top shield forming a ground plate on a top of the tongue and having an extension attached to a tab at a side edge of the center plate; and a bottom shield forming a ground plate on a bottom of the tongue and having an extension attached to the tab at the side edge of the center plate.

7. The connector of claim 1 wherein the connector is a connector receptacle.

8. A connector comprising:

a housing; and a tongue comprising:

a center plate extending through the housing to a front edge of the tongue and laterally through the tongue and having a top surface and a bottom surface, the center plate comprising a vertical portion, the vertical portion extending orthogonally from the top surface above the top surface of the center plate and below the bottom surface of the center plate;

a first plurality of contacts having contacting surfaces extending towards the front edge of the tongue and over the top surface of the center plate, the first plurality of contacts supported by the housing;

a first sub-housing supporting the first plurality of contacts;

a second plurality of contacts having contacting surfaces extending towards the front edge of the tongue and below the bottom surface of the center plate, the second plurality of contacts supported by the housing; and a second sub-housing supporting the second plurality of contacts.

9. An electronic device comprising:

a connector according claim 8 to provide a power supply voltage; and a transformer used in generating the power supply voltage, the transformer comprising:

a printed circuit board having a plurality of layers;

a wire formed as a first coil on a top surface of the printed circuit board and a second coil on a bottom of the printed circuit board, the first coil and the second coil forming a first winding; and a second winding formed of metalized patterns on layers of the printed circuit board.

10. The electronic device of claim 9 wherein the first winding is a primary winding and the second winding is a secondary winding.

11. The electronic device of claim 10 wherein the printed circuit board includes an annular portion having a central opening, the printed circuit board further including a first notch in the central opening, wherein the wire is routed through the first notch from the first coil to the second coil.

12. An electronic device comprising:

a connector according claim 8 to provide a power supply voltage; and a choke module used in generating the power supply voltage, the choke module comprising:

a first low-frequency choke;

a second high-frequency choke; and a housing to support the first low-frequency choke and the second high-frequency choke.

13. The electronic device of claim 12 wherein the first low-frequency choke comprises a rectangular core formed by either two U-shape or two C-shape cores, a first wire wound on a first leg of the rectangular core, and a second wire wound on a second leg of the rectangular core, and wherein the second high-frequency choke comprises a toroidal core, a first wire, and a second wire, the first and second wires wound adjacent to each other and around the rectangular core.

14. The connector of claim 8 further comprising an extension portion extending from the vertical portion, where the extension portion extends around and is attached to the front edge of the tongue.

15. The connector of claim 14 wherein the extension portion forms a side ground contact on the tongue.

16. The connector of claim 15 wherein the vertical portion is formed by deep drawing.

17. The connector of claim 16 wherein the first plurality of contacts comprises a first ground contact, the first ground contact having a first portion including a contacting surface extending towards the front edge of the tongue and having a second portion folded below the first portion, the first ground contact having a connection plate extending parallel to the front edge of the tongue from the second portion, the connection plate attached to the center plate.

18. The connector of claim 17 further comprising:

a top shield forming a ground plate on a top of the tongue and having an extension attached to a tab at a side edge of the center plate; and a bottom shield forming a ground plate on a bottom of the tongue and having an extension attached to the tab at the side edge of the center plate.

19. A connector comprising:

a housing; and a tongue comprising:

a center plate extending through the housing to a front edge of the tongue and laterally through the tongue and having a top surface and a bottom surface;

a side portion attached to the center plate and extending along sides and front edge of the center plate, the side portion extending orthogonally to the center plate and above the top surface of the center plate and below the bottom surface of the center plate;

a first plurality of contacts having contacting surfaces extending towards the front edge of the tongue and over the top surface of the center plate, the first plurality of contacts supported by the housing;

a first sub-housing supporting the first plurality of contacts;

a second plurality of contacts having contacting surfaces extending towards the front edge of the tongue and below the bottom surface of the center plate, the second plurality of contacts supported by the housing; and a second sub-housing supporting the second plurality of contacts.

20. The connector of claim 19 wherein the side portion forms a side ground contact on the tongue.

* * * * *